(12) United States Patent
Matsumoto

(10) Patent No.: US 9,687,863 B2
(45) Date of Patent: Jun. 27, 2017

(54) ROTARY ATOMIZING HEAD TYPE COATING MACHINE

(71) Applicant: ABB K.K., Tokyo (JP)

(72) Inventor: Tomohiro Matsumoto, Fujieda-shi (JP)

(73) Assignee: ABB K.K., Tokyo (JP)

( * ) Notice: Subject to any disclaimer, the term of this patent is extended or adjusted under 35 U.S.C. 154(b) by 121 days.

(21) Appl. No.: 14/425,181

(22) PCT Filed: Apr. 15, 2014

(86) PCT No.: PCT/JP2014/060733
§ 371 (c)(1),
(2) Date: Mar. 2, 2015

(87) PCT Pub. No.: WO2015/004966
PCT Pub. Date: Jan. 15, 2015

(65) Prior Publication Data
US 2015/0217306 A1 Aug. 6, 2015

(30) Foreign Application Priority Data

Jul. 12, 2013 (JP) .................................. 2013-146612

(51) Int. Cl.
*B05B 3/10* (2006.01)
(52) U.S. Cl.
CPC .......... *B05B 3/1064* (2013.01); *B05B 3/1007* (2013.01); *B05B 3/1014* (2013.01);
(Continued)
(58) Field of Classification Search
CPC ... B05B 3/1035; B05B 3/1042; B05B 3/1007; B05B 3/1092; B05B 3/1014; B05B 3/1064
(Continued)

(56) References Cited

U.S. PATENT DOCUMENTS

| 4,928,883 A | * | 5/1990 | Weinstein | ............. | B05B 3/1064 239/223 |
| 4,936,507 A | * | 6/1990 | Weinstein | ............. | B05B 3/1064 239/223 |

(Continued)

FOREIGN PATENT DOCUMENTS

| JP | 60-148053 U | 10/1985 |
| JP | 09-220498 | 8/1997 |

(Continued)

OTHER PUBLICATIONS

International Search Report issued Jul. 15, 2014 in PCT/JP2014/060733 filed Apr. 15, 2014.

*Primary Examiner* — Arthur O Hall
*Assistant Examiner* — Steven M Cernoch
(74) *Attorney, Agent, or Firm* — Oblon, McClelland, Maier & Neustadt, L.L.P.

(57) ABSTRACT

An annular gap space (18), into which a part of turbine air for driving a turbine (6) and exhaust air discharged from a rear thrust air bearing (12) flow out, is provided between an inner peripheral surface (5B) of a rotational shaft (5) and an outer peripheral surface (17B) of a feed tube (17). Air outflow holes (25) are provided in the rotational shaft (5) to be positioned between a radial air bearing (8) and a rotary atomizing head (16) and to be radially bored through the rotational shaft (5). As a result, the exhaust air flowing in the annular gap space (18) flows out outside of the rotational shaft (5) from the air outflow holes (25) in a position behind the rotary atomizing head (16).

3 Claims, 13 Drawing Sheets

(52) U.S. Cl.
CPC .......... *B05B 3/1035* (2013.01); *B05B 3/1042* (2013.01); *B05B 3/1092* (2013.01)

(58) Field of Classification Search
USPC ....... 239/290, 291, 293, 461, 463, 483, 526, 239/529, 398, 399, 419.5, 429, 222.11, 239/222.13, 222.17, 223, 224
See application file for complete search history.

(56) References Cited

U.S. PATENT DOCUMENTS

| | | | | |
|---|---|---|---|---|
| 4,936,509 | A * | 6/1990 | Weinstein | B05B 3/1064 239/112 |
| 4,936,510 | A * | 6/1990 | Weinstein | B05B 3/1064 239/223 |
| 4,997,130 | A * | 3/1991 | Weinstein | B05B 3/1064 239/222 |
| 5,788,164 | A * | 8/1998 | Tomita | B05B 3/1064 239/112 |
| 6,105,886 | A * | 8/2000 | Hollstein | B05B 3/1064 239/105 |
| 7,055,768 | B1 * | 6/2006 | Stratton | B05B 3/1014 239/223 |
| 7,237,726 | B2 * | 7/2007 | Yu | B05B 3/10 239/222.11 |
| 2006/0226258 | A1 * | 10/2006 | Yu | B05B 3/10 239/290 |

FOREIGN PATENT DOCUMENTS

| | | |
|---|---|---|
| JP | 09-285742 | 11/1997 |
| JP | 2000-033292 | 2/2000 |
| JP | 2003-117440 | 4/2003 |

* cited by examiner

ROTARY ATOMIZING HEAD TYPE COATING MACHINE

TECHNICAL FIELD

The present invention relates to a rotary atomizing head type coating machine that sprays paint toward a coating object by rotating a rotary atomizing head at high speeds with an air motor, for example.

BACKGROUND ART

In general, in a case of coating vehicle bodies of automobiles, articles of furniture, electrical appliances, and the like with paint, a rotary atomizing head type coating machine that is excellent in a coating efficiency and coating finish of paint is used for coating. This rotary atomizing head type coating machine includes a tubular housing in an inner peripheral side of which a motor accommodating section is formed, an air motor that is accommodated in the motor accommodating section of the housing and drives and rotates a hollow rotational shaft, a rotary atomizing head that is positioned on the front side of the housing and is mounted to the front end of the rotational shaft in the air motor to spray paint supplied while rotating together with the rotational shaft, a feed tube that is provided inside the rotational shaft to axially extend with a radial gap to the rotational shaft to supply the paint to the rotary atomizing head, and a shaping air ring that is provided on the front side of the housing to eject shaping air for arranging a spraying pattern of the paint sprayed from the rotary atomizing head.

The air motor includes a motor case that is formed of a tubular body axially extending and is accommodated in the motor accommodating section, a rotational shaft that is provided in the motor case to axially extend therein, a turbine that is provided at a base end side of the rotational shaft and drives and rotates the rotational shaft by supply of turbine air thereto, a radial air bearing that is positioned on an outer peripheral side of the rotational shaft and is provided in the motor case to radially support the rotational shaft by supply of bearing air thereto, front and rear thrust air bearings that are provided in the motor case in such a manner as to interpose the turbine therebetween in the front-rear direction to support the rotational shaft in a thrust direction by supply of the bearing air thereto, a turbine air passage that includes an air supply passage for supplying the turbine air to the turbine and an air discharge passage for discharging exhaust air after driving and rotating the turbine, and a bearing air passage that supplies the bearing air to the radial air bearing and the front and rear thrust air bearings. With this configuration, the rotational shaft is supported in a non-contact state by the radial air bearing, and the turbine is supported in a non-contact state by the front thrust air bearing and the rear thrust air bearing.

An impeller with a plurality of rotor blades that radially extend to overlap in the circumferential direction is provided on the outer peripheral side of a general turbine. The turbine can rotate the rotational shaft at high speeds by spraying turbine air (compressed air) toward the impeller from an air nozzle (Patent Document 1).

PRIOR ART DOCUMENT

Patent Document

Patent Document 1: Japanese Patent Laid-Open No. Hei 9-285742 A

SUMMARY OF THE INVENTION

The rotary atomizing head type coating machine according to Patent Document 1 sprays the turbine air from the air supply passage in the turbine air passage toward the impeller to rotate the turbine. In this case, the turbine air after being sprayed toward the turbine is discharged as exhaust air outside through the air discharge passage. However, a part of the turbine air flows out into an annular gap space formed between the rotational shaft and a feed tube through a slight gap between the turbine and the rear thrust air bearing.

On the other hand, in each of the thrust air bearings and the radial air bearing, a flow amount per time of the bearing air to be supplied is remarkably smaller than a flow amount per time of the turbine air. The flow amount of the bearing air is regularly approximately 10% of the flow amount of the turbine air. Therefore, a general air bearing is not provided with a passage for discharging the bearing air. As a result, the bearing air supplied to the radial air bearing is discharged through the gap between the air bearing and the rotational shaft. In addition, the front thrust air bearing among the front and rear thrust air bearings arranged in a front-rear direction to interpose the turbine therebetween discharges the discharged exhaust air together with the exhaust air of the turbine air to the air discharge passage. However, in the rear thrust air bearing, a part of the discharged exhaust air flows out into the annular gap space formed between the rotational shaft and the feed tube through the gap between a rear surface of the turbine and the rear thrust air bearing.

In this way, the annular gap space between the rotational shaft and the feed tube, into which a part of the turbine air and the bearing air flows out, is communicated with an inside of the rotary atomizing head at a front end side of the rotational shaft. Therefore, there is a possibility that a part of the turbine air and the bearing air comes to be mixed in the paint supplied from the feed tube.

In a case where the air comes to be mixed in the paint supplied to the rotary atomizing head, air bubbles are formed in the paint. Therefore, the air bubble in the paint generates a non-coating part on a coating surface, causing a coating failure. Other than that, in a case where the paint that is left without being washed out is attached to the front end side of the feed tube, this attached paint is scratched off by a part of the turbine air and the bearing air to become small pieces, and the small pieces might possibly come to be mixed in the paint. Also in this case, there is a problem that there might occur the coating failure.

In view of the above-discussed problems with the conventional art, it is an object of the present invention to provide a rotary atomizing head type coating machine that can prevent, even in a case where a part of turbine air and bearing air flows out into a gap space between a rotational shaft and a feed tube, this air from flowing into a rotary atomizing head, thus suppressing occurrence of a coating failure.

(1). A rotary atomizing head type coating machine according the present invention comprising: a tubular housing in an inner peripheral side of which a motor accommodating section is formed; an air motor that is accommodated in the motor accommodating section of the housing and rotates a hollow rotational shaft; a rotary atomizing head that is positioned on the front side of the housing and is mounted to the front end of the rotational shaft in the air motor to spray paint supplied while rotating together with the rotational shaft; a feed tube that is provided inside the rotational shaft to axially extend with a radial gap to the rotational shaft and supplies the paint to the rotary atomizing head; and a shaping air ring that is provided on the front side of the housing to eject shaping air for arranging a spraying pattern of the paint sprayed from the rotary atomizing head, wherein the air motor includes: a motor case that is formed of a tubular body axially extending and is accommodated in the motor accommodating section of the housing; the rotational shaft that is provided in the motor case to axially extend therein; a turbine that is provided at a base end side of the rotational shaft and rotates the rotational shaft by supply of turbine air thereto; a radial air bearing that is positioned on an outer peripheral side of the rotational shaft and is provided in the motor case to radially support the rotational shaft by supply of bearing air thereto; a front thrust air bearing and a rear thrust air bearing that are provided in the motor case to interpose the turbine therebetween in the front-rear direction to support the rotational shaft in a thrust direction by supply of the bearing air thereto; a turbine air passage that includes an air supply passage for supplying the turbine air to the turbine and an air discharge passage for discharging exhaust air after rotating the turbine; and a bearing air passage that supplies the bearing air to the radial air bearing and the front and rear thrust air bearings.

In order to solve the aforementioned problems, the characteristic of the present invention lies in a configuration that an annular gap space, into which a part of the turbine air and exhaust air discharged from the rear thrust air bearing flow out, is provided between the rotational shaft and the feed tube, and an air outflow hole is provided in the rotational shaft to be positioned between the radial air bearing and the rotary atomizing head and to be radially bored through the rotational shaft, wherein the air outflow hole causes the exhaust air flowing in the annular gap space to flow out outside of the rotational shaft in a position behind the rotary atomizing head.

With this arrangement, the rotational shaft is provided with the air outflow hole that is positioned between the radial air bearing arranged on the outer peripheral side of the rotational shaft and the rotary atomizing head to be bored through the rotational shaft in the radial direction. On the other hand, there are some cases where a part of the turbine air at the time of supplying the turbine air from the air supply passage in the turbine air passage to the turbine or the exhaust air discharged from the rear thrust air bearing flows out into the annular gap space formed between the rotational shaft and the feed tube. Also in this case, the air outflow hole enables the exhaust air flowed out into the annular gap space to flow out outside of the rotational shaft in the position behind the rotary atomizing head.

Accordingly, it is possible to prevent the exhaust air of the turbine air and the bearing air from coming to be mixed in the paint supplied from the feed tube. Further, since the exhaust air is discharged outside of the rotational shaft from the air outflow hole without reaching the front end of the feed tube, it is possible to prevent the paint attached to the feed tube from being scratched off to come to be mixed in the paint.

As a result, it is possible to suppress occurrence of the coating failure due to the event that the exhaust air comes to be mixed in the paint or the small piece scratched off from the attached paint comes to be mixed in the paint to improve reliability and a coating efficiency to the rotary atomizing head type coating machine.

(2) According to the present invention, the air outflow holes are arranged in a plurality of locations in the rotational shaft to be spaced from each other in the circumferential direction. Therefore, the exhaust air flowing in the annular gap space is made to flow into the plurality of air outflow holes, thereby making it possible to cause the exhaust air to efficiently flow out outside of the rotational shaft from the annular gap space.

(3) According to this configuration, an annular projecting portion is provided on an inner peripheral surface of the rotational shaft and/or on an outer peripheral surface of the feed tube in a position closer to the rotary atomizing head than a position of the air outflow hole, the annular projecting portion radially projecting from the inner peripheral surface and/or the outer peripheral surface to partition the annular gap space.

With this arrangement, the annular projecting portion that is provided to radially project on the inner peripheral surface of the rotational shaft and/or on the outer peripheral surface of the feed tube can partition the annular gap space while allowing rotation of the rotational shaft between the air outflow hole and the rotary atomizing head. As a result, the annular projecting portion can introduce the exhaust air flowing in the annular gap space to the air outflow hole to cause a great deal of the exhaust air to flow out outside of the rotational shaft.

(4) According to the present invention, the air outflow hole is formed to be inclined such that an opening end thereof opened to an outer peripheral surface of the rotational shaft is positioned closer to an axial front side than an opening end thereof opened to an inner peripheral surface of the rotational shaft. Therefore, the air outflow hole can be arranged at a gradual angle from the annular gap space to the rotary atomizing head. Therefore, the exhaust air can smoothly flow into the opening end of the inner peripheral surface and can smoothly flow out from the opening end of the outer peripheral surface. As a result, the exhaust air can efficiently flow out outside of the rotational shaft from the annular gap space.

MODE FOR CARRYING OUT THE INVENTION

Hereinafter, rotary atomizing head type coating machines according to embodiments of the present invention will be in detail explained with reference to the accompanying drawings.

FIG. 1 to FIG. 6 show a first embodiment of a rotary atomizing head type coating machine in the present invention.

Figure 1:
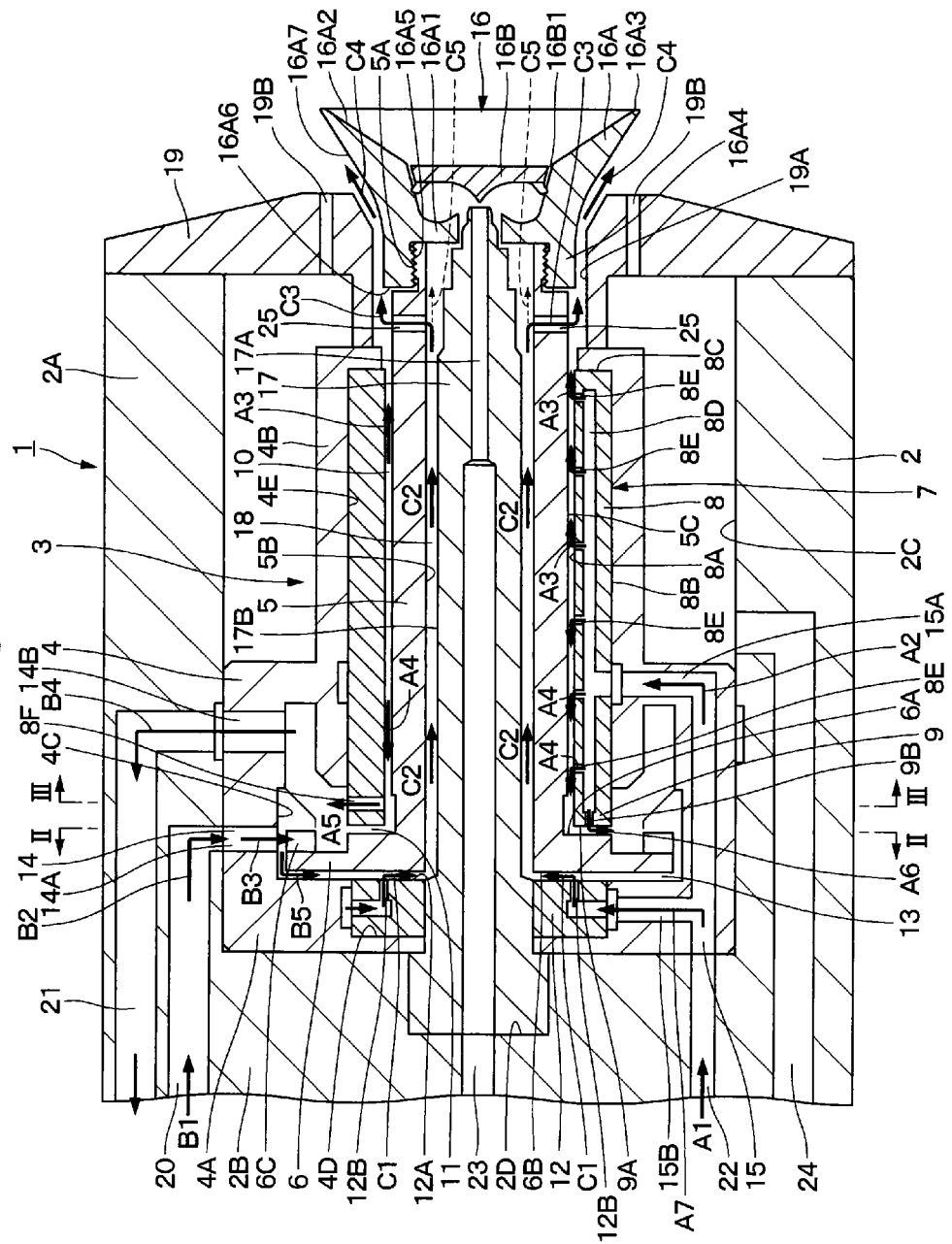
FIG. 1 is a longitudinal sectional view showing a rotary atomizing head type coating machine according to a first embodiment in the present invention as viewed in the direction of arrows I-I in FIG. 3.

In FIG. 1, designated at 1 is a rotary atomizing head type coating machine according to the first embodiment. The rotary atomizing head type coating machine 1 is formed as an electrostatic coating machine that directly applies high voltages to paint, for example, by a high-voltage generator (not shown). The rotary atomizing head type coating machine 1 is mounted to, for example, a front end of an arm (not shown) in a coating robot, a reciprocator and the like. The rotary atomizing head type coating machine 1 includes a housing 2, an air motor 3, a rotary atomizing head 16, a feed tube 17, an annular gap space 18, a shaping air ring 19, a turbine air supply line 20, a turbine air discharge line 21, a bearing air supply line 22, and air outflow holes 25, which will be described later.

Indicated at 2 is the housing of the rotary atomizing head type coating machine 1. The housing 2 is formed as a bottomed tubular body by a tubular section 2A that is positioned on the front side and is formed in a cylindrical shape and a bottom section 2B that is provided to close off a rear side of the tubular section 2A. The bottom section 2B side of the housing 2 is mounted to, for example, an arm front end of a coating robot. Here, an inner peripheral side of the tubular section 2A forms part of a motor accommodating section 2C that is opened to the front side. An air motor 3 which will be described later is accommodated in the motor accommodating section 2C. On the other hand, a recess section 2D is provided in the center position in the depth part of the motor accommodating section 2C, that is, in the center position on the front surface of the bottom section 2B to mount a feed tube 17 thereon which will be described later. Further, the housing 2 is provided therein with the turbine air supply line 20, the turbine air discharge line 21, the bearing air supply line 22, a paint line 23, and a shaping air supply line 24, which will be described later.

Here, the configuration of the air motor 3 that is the essential part in the first embodiment will be described.

That is, the air motor 3 is provided in the housing 2, and the air motor 3 rotates the rotary atomizing head 16 which will be described later at high speeds of, for example, 3000 to 150000 rpm by using compressed air as a power source. The air motor 3 includes a motor case 4, a rotational shaft 5, a turbine 6, a radial thrust air bearing 7, a rear thrust air bearing 12, a turbine air passage 14, and a bearing air passage 15, which will be described later.

The motor case 4 forms part of an outer shell of the air motor 3, and the motor case 4 is formed of a tubular body axially extending, and is accommodated in the motor accommodating section 2C of the housing 2. The motor case 4 is formed of a large diameter tube 4A that is inserted in the depth part of the motor accommodating section 2C, and a small diameter tube 4B that extends from an inner diameter side to a front side of the large diameter tube 4A. The motor case 4 is formed in a stepped tubular shape as a whole. A turbine accommodating chamber 4C for accommodating the turbine 6 therein is formed inside of the large diameter tube 4A, and a deeper part than the turbine accommodating chamber 4C inside of the large diameter tube 4A is formed as a rear bearing fitting chamber 4D for fitting the rear thrust air bearing 12 therein. On the other hand, a front bearing fitting chamber 4E for fitting the radial thrust air bearing 7 therein is formed in an inner peripheral side of the small diameter tube 4B.

The rotational shaft 5 is provided to axially extend in the motor case 4. The rotational shaft 5 is formed as a cylindrical body extending along the center axis of the motor case 4, and is rotatably supported by the radial thrust air bearing 7. A male screw portion 5A is formed in a diameter-reduced front end portion of the rotational shaft 5 to mount the rotary atomizing head 16 which will be described later thereon. On the other hand, the turbine 6 is provided at the base end side of the rotational shaft 5 to be integral therewith. Further, an inner peripheral surface 5B of the rotational shaft 5 faces an outer peripheral surface 17B of the feed tube 17 to put an annular gap space 18 which will be described later therebetween. An outer peripheral surface 5C of the rotational shaft 5 faces an inner peripheral surface 8A of the radial thrust air bearing 7 to put an annular radial gap 10 which will be described later therebetween.

Here, a large part of the rotational shaft 5 other than a part of the front end side (rotary atomizing head 16 side) thereof is arranged in a range inside the radial thrust air bearing 7. Air outflow holes 25 which will be describe later are provided on the front end side in the rotational shaft 5 projecting from the radial thrust air bearing 7, that is, between the radial thrust air bearing 7 and the male screw portion 5A.

The turbine 6 is provided on the base end side of the rotational shaft 5 to be positioned in the turbine accommodating chamber 4C of the motor case 4. The turbine 6 is formed of a disk body that expands to be enlarged in a flange shape from the rotational shaft 5, and is jointed to the rotational shaft 5 by means of welding, press abutment and the like, or is formed integrally with the rotational shaft 5. A front surface 6A of the turbine 6 faces a rear surface 9A of the front thrust air bearing 9 to interpose a front thrust gap 11 which will be described later therebetween. On the other hand, a rear surface 6B of the turbine 6 faces a front surface 12A of the rear thrust air bearing 12 to interpose a rear thrust gap 13 which will be described later therebetween.

Figure 2:
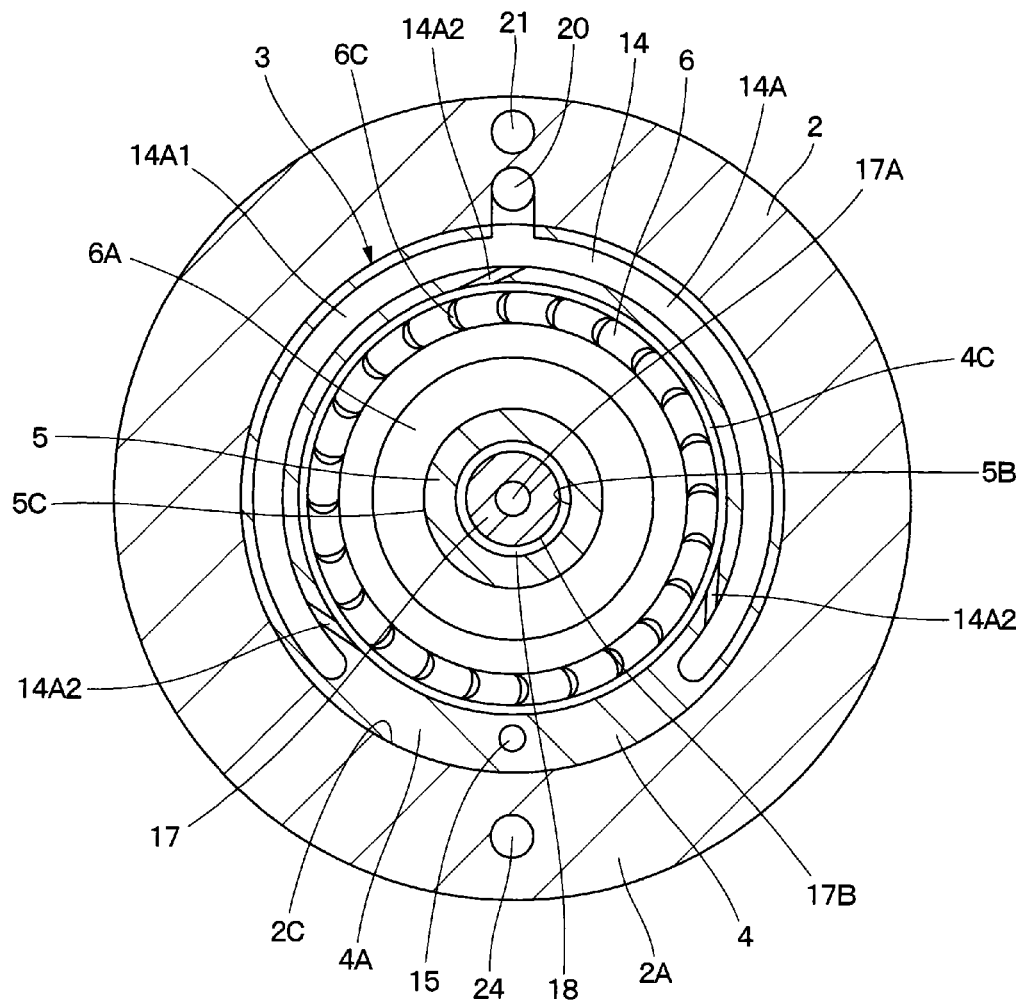
FIG. 2 is a transverse sectional view showing the rotary atomizing head type coating machine as viewed in the direction of arrows II-II in FIG. 1.

Further, as shown in FIG. 2, an impeller 6C is provided on the outer peripheral side of the turbine 6 with a plurality of rotor blades that forward project and radially extend to overlap in the circumferential direction. The turbine 6 can rotate together with the rotational shaft 5 at high speeds by jetting turbine air toward the impeller 6C from air nozzles 14A2 in an air supply passage 14A which will be described later.

The radial thrust air bearing 7 is provided to the motor case 4 to be positioned on the outer peripheral side of the rotational shaft 5. The radial thrust air bearing 7 forms a radial air bearing 8 that radially supports the rotational shaft 5 and the front thrust air bearing 9 that supports the rotational shaft 5 (turbine 6) in a thrust direction integrally. Therefore, the downsizing and cost reduction of the air motor 3 are achieved. However, the radial air bearing 8 and the front thrust air bearing 9 may be provided individually.

The radial air bearing 8 forms a large part of the radial thrust air bearing 7 other than a rear part thereof. The radial air bearing 8 is formed of a cylindrical body including the inner peripheral surface 8A, an outer peripheral surface 8B, and a front surface 8C, and the outer peripheral surface 8B is fitted in the front bearing fitting chamber 4E that is provided in the small diameter tube 4B of the motor case 4. The radial air bearing 8 is provided with, for example, a plurality of common passages 8D that axially extend and are arranged at intervals in the circumferential direction, and the inner peripheral surface 8A is provided with many pieces of radial air ejecting holes 8E (only six pieces are shown in FIG. 1) that are communicated with the respective common passages 8D and open inward.

Figure 3:
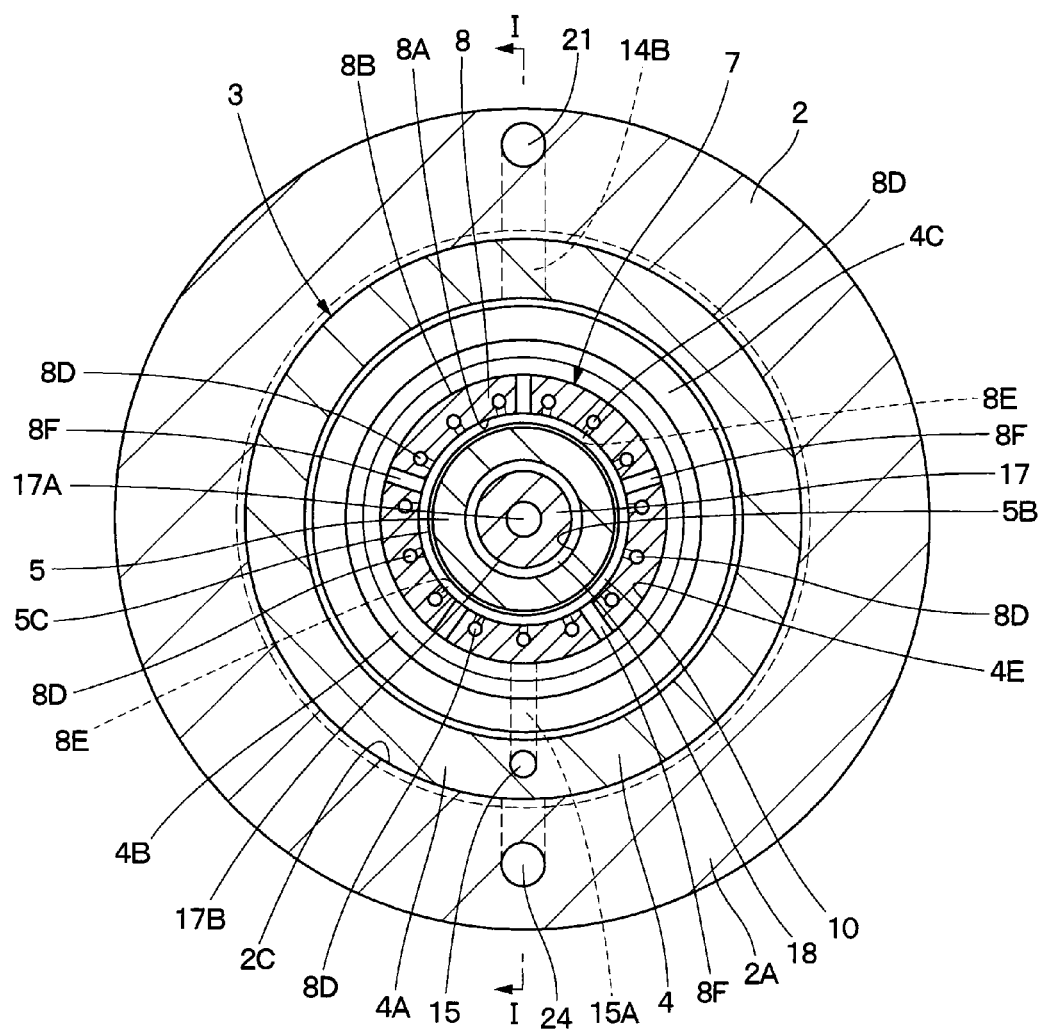
FIG. 3 is a transverse sectional view showing the rotary atomizing head type coating machine as viewed in the direction of arrows III-III in FIG. 1.

Further, as shown in FIG. 1 and FIG. 3, a plurality of air release holes 8F are provided on the rear side of the radial air bearing 8, that is, near a thrust air ejecting hole 9B of the front thrust air bearing 9 which will be described later. The air release holes 8F are radially bored through the radial air bearing 8 to avoid the respective common passages 8D. Here, each of the air release holes 8F introduces air, which is discharged after being ejected from the air ejecting hole 8E and the thrust air ejecting hole 9B of the front thrust air bearing 9 which will be described later, to an air discharge passage 14B side in a turbine air passage 14.

The front thrust air bearing 9 is provided in the rear part of the radial thrust air bearing 7. A large number of thrust air ejecting holes 9B (only one is shown in FIG. 1) communicated with the common passages 8D in the radial air bearing 8 are provided in the rear surface 9A of the front thrust air bearing 9 to be open backward.

The radial air bearing 8 has the inner peripheral surface 8A that faces the outer peripheral surface 5C of the rotational shaft 5 to put the annular radial gap 10 therebetween. On the other hand, the front thrust air bearing 9 has the rear surface 9A that faces the front surface 6A of the turbine 6 to put the front thrust gap 11 therebetween. Here, the annular radial gap 10 is a gap for forming an air layer of bearing air that is ejected from each of the radial air ejecting holes 8E. This annular radial gap 10 is generally a small gap of approximately 10 to 50 µm, but is illustrated to be enlarged for easy understanding. The front thrust gap 11 is also illustrated by enlarging a small gap as similar to the annular radial gap 10.

Figure 4:
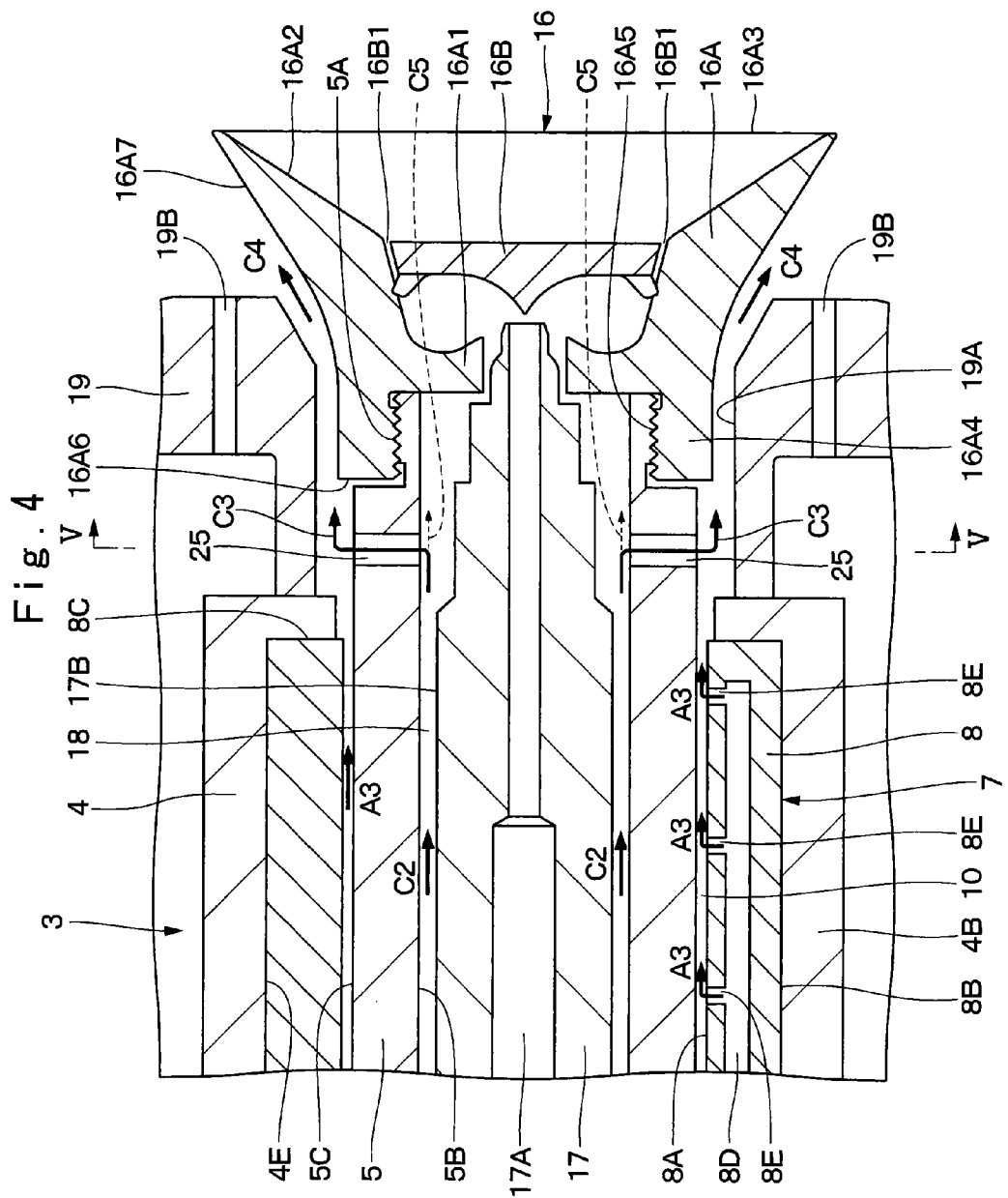
FIG. 4 is an enlarged longitudinal sectional view showing an essential part of the rotary atomizing head type coating machine.

Next, flow of the bearing air at the time of supporting the rotational shaft 5 and the turbine 6 by the radial air bearing 8 and the front thrust air bearing 9 will be described with reference to FIG. 1 and FIG. 4.

The bearing air supplied through the bearing air supply line 22 flows in an arrow A1 direction into a bearing air passage 15, and then flows in an arrow A2 direction toward the respective common passages 8D of the radial air bearing 8 from first passages 15A in the bearing air passage 15. As a result, the radial air bearing 8 forms an air layer in the annular radial gap 10 by ejecting the bearing air from each of the radial air ejecting holes 8E, thus making it possible to rotatably support the rotational shaft 5 while radially (radial direction) positioning it. The bearing air ejected into the annular radial gap 10 partly flows forward in an arrow A3 direction in the annular radial gap 10, and flows in an arrow C4 direction in a gap between the rotary atomizing head 16 and the shaping air ring 19, which will be described later, to be discharged outside of the coating machine 1. On the other hand, the remaining bearing air flows backward in the arrow A4 direction in the annular radial gap 10, flows through each of the air release holes 8F as shown in an arrow A5, and flows in an arrow B4 direction from an air discharge passage 14B to be discharged outside of the coating machine 1.

On the other hand, the front thrust air bearing 9 ejects the bearing air to be supplied to the respective common passages 8D from the respective thrust air ejecting holes 9B of the rear surface 9A to form an air layer in the front thrust gap 11, thus regulating the forward movement of the turbine 6 and the rotational shaft 5 in the thrust (axial) direction. Here, when the bearing air is ejected from the respective thrust air ejecting holes 9B to the front thrust gap 11, the bearing air flows radially outside in the front thrust gap 11 in an arrow A6 direction, flows in the arrow B4 direction from the air discharge passage 14B, and then is discharged outside.

The rear thrust air bearing 12 is fitted in the rear bearing fitting chamber 4D of the motor case 4, and the rear thrust air bearing 12 supports the rotational shaft 5 in the thrust direction through the turbine 6 by interposing the turbine 6 in a front-rear direction in cooperation with the front thrust air bearing 9. The rear thrust air bearing 12 is provided with many thrust air ejecting holes 12B (only two are shown in FIG. 1) that are open to the front surface 12A.

Here, the front surface 12A of the rear thrust air bearing 12 faces the rear surface 6B of the turbine 6 to interpose a rear thrust gap 13 therebetween. The rear thrust gap 13 is, as similar to the annular radial gap 10 and the front thrust gap 11 described before, also a gap for forming an air layer of bearing air ejected from the respective thrust air ejecting holes 12B. A gap dimension of the rear thrust gap 13 is approximately 10 to 50 µm, but is illustrated to be enlarged for easy understanding.

Next, a flow of the bearing air at the time of supporting the turbine 6 by the rear thrust air bearing 12 will be explained. The bearing air supplied through the bearing air supply line 22 flows in the arrow A1 direction into the bearing air passage 15, and flows in the second passage 15B in the bearing air passage 15 in an arrow A7 direction toward the rear thrust air bearing 12. Therefore, the rear thrust air bearing 12 ejects bearing air from the respective thrust air ejecting holes 12B to form an air layer in the rear thrust gap 13, thereby making it possible to regulate the backward movement of the rotational shaft 5 together with the turbine 6 in the thrust (axial) direction. On the other hand, the bearing air ejected to the rear thrust gap 13 flows radially inward in an arrow C1 direction in the rear thrust gap 13, flows out into the annular gap space 18 which will be described later, and flows forward in an arrow C2 direction in the annular gap space 18.

The turbine air passage 14 is provided in a large diameter tube 4A in a motor case 4. The turbine air passage 14 supplies turbine air (compressed air) as a drive source of the turbine 6 toward the turbine 6, and discharges the turbine air, which has driven the turbine 6, outside of the coating machine 1. That is, the turbine air passage 14 is configured of an air supply passage 14A and an air discharge passage 14B.

The air supply passage 14A is provided in the large diameter tube 4A in the motor case 4, having an inflow side communicated with the turbine air supply line 20 which will be described later and an outflow side communicated with the turbine accommodating chamber 4C. As shown in FIG. 2, the air supply passage 14A is configured of a C letter-shaped passage 14A1 surrounding the turbine accommodating chamber 4C, and a plurality of, for example, three air nozzles 14A2 that are open on the outer periphery of the turbine accommodating chamber 4C from the C letter-shaped passage 14A1 toward the impeller 6C of the turbine 6. Each of the air nozzles 14A2 jets the turbine air to the impeller 6C to press the impeller 6C in the circumferential direction, and is formed to be inclined to a tangential direction of the turbine 6.

The air discharge passage 14B is provided in the large diameter tube 4A in the motor case 4, and discharges exhaust air after rotating the turbine 6. The air discharge passage 14B has an inflow side communicated with a front position of the turbine air accommodating chamber 4C and an outflow side communicated with the turbine air discharge line 21 which will be described later.

Next, a flow of the turbine air at the time of rotating the turbine 6 in the air motor 3 will be explained. The turbine air flowing in an arrow B1 direction in the turbine air supply line 20 flows in an arrow B2 direction toward the C letter-shaped passage 14A1 in the air supply passage 14A, and is ejected to the impeller 6C of the turbine 6 from the respective air nozzles 14A2 as shown in an arrow B3. Therefore, the turbine air can rotate the turbine 6. On the other hand, the turbine air supplied in the arrow B3 direction toward the turbine 6 rotates the impeller 6C, and thereafter, a large part thereof becomes exhaust air, flows out in the air discharge passage 14B through the turbine accommodating chamber 4C as shown in an arrow B4, and is discharged outside from the turbine air discharge line 21. Here, apart of the turbine air supplied toward the turbine 6 in the arrow B3 direction flows radially inward in the rear thrust gap 13 in an arrow B5 direction, flows out into the annular gap space 18 as shown in the arrow C1 direction, and flows forward in the arrow C2 direction in the annular gap space 18.

The bearing air passage 15 is provided in the large diameter tube 4A in the motor case 4, and the bearing air passage 15 has an inflow side communicated with the bearing air supply line 22 which will be described later. An outflow side of the bearing air passage 15 is branched into a first passage 15A and a second passage 15B. The first passage 15A is communicated with the common passage 8D in the radial air bearing 8 and the second passage 15B is communicated with the thrust air ejecting hole 12B in the rear thrust air bearing 12.

Next, the rotary atomizing head 16 for spraying paint, the feed tube 17 as a paint supply system, the shaping air ring 19 that adjusts a spraying pattern of paint, an air supply line, a paint supply line, and the like will be explained.

Designated at 16 is the rotary atomizing head that is positioned in front of the housing 2 and is mounted on a front end of the rotational shaft 5 in the air motor 3. The rotary atomizing head 16 sprays supplied paint while rotating together with the rotational shaft 5. The rotary atomizing head 16 includes, for example, an atomizing head body 16A formed in a bell shape or a cup shape to open to be enlarged from the rear side as an axial base end to the front side as a front end, and a hub member 16B provided in an inner peripheral side of the atomizing head body 16A. The hub member 16B has an outer peripheral side that is provided with a plurality of paint outflow holes 16B1 formed over the entire periphery.

An annular partition wall 16A1 is provided in the inner section in the atomizing head body 16A in rear of the hub member 16B. The annular partition wall 16A1 is formed by radially inside shortening a diameter of the inner section of the atomizing head body 16A. Here, the annular partition wall 16A1 surrounds a front end portion of the feed tube 17 with a slight gap to prevent paint supplied from the feed tube 17 from flowing into the rotational shaft 5. On the other hand, the annular partition wall 16A1 also has a function of suppressing air, which flows to the side of the rotary atomizing head 16 in the annular gap space 18, from flowing into the rotary atomizing head 16.

A paint spreading surface 16A2 that opens to be enlarged in a circular dish shape is formed on an inner side of the atomizing head body 16A in a position prior to the hub member 16B, and a front end of the atomizing head body 16A is formed as a paint releasing edge 16A3 continuous to the paint spreading surface 16A2. In a state where the rotary atomizing head 16 is being rotated at high speeds by the air motor 3, paint is supplied from a paint passage 17A in the feed tube 17, and thereby, the paint is introduced from the hub member 16B to the paint spreading surface 16A2 through the respective paint outflow holes 16B1, and is sprayed as countless paint particles atomized by a centrifugal force from the paint releasing edge 16A3.

On the other hand, the rear side of the atomizing head body 16A is formed as a cylindrical rotational shaft mount portion 16A4, and a female screw portion 16A5 threaded into the male screw portion 5A of the rotational shaft 5 is formed in the inner peripheral side of the rotational shaft mount portion 16A4. The outer side of the atomizing head body 16A is formed as an outer peripheral surface 16A7 that is smoothly enlarged in a diameter from a rear end 16A6 of the rotational shaft mount portion 16A4 over the paint releasing edge 16A3.

Designated at 17 is a feed tube provided to axially extend in the rotational shaft 5 of the air motor 3. A base end of the feed tube 17 is mounted to the recess section 2D in the housing 2 in a fitting state, and a front end of the feed tube 17 projects from the front end of the rotational shaft 5 and extends into the rotary atomizing head 16. The paint passage 17A extending along an axis center position is formed inside the feed tube 17, and the paint passage 17A is connected to a paint supply source (not shown) including a paint tank and a color changing valve device through the paint line 23 which will be described later. Thereby, the feed tube 17 supplies paint from the paint passage 17A to the rotary atomizing head 16.

Here, the feed tube 17 is arranged in the rotational shaft 5 in a state where the outer peripheral surface 17B has a radial gap to the rotational shaft 5. That is, the annular gap space 18 which will be described later is formed between the feed tube 17 and the rotational shaft 5.

The annular gap space 18 is formed between the rotational shaft 5 and the feed tube 17. The annular gap space 18 is a space provided in such a manner that when the rotational shaft 5 rotates around the periphery of the fixed feed tube 17, the rotational shaft 5 and the feed tube 17 are not in contact with each other, and a radial dimension of the annular gap space 18 is set to be, for example, approximately 0.2 to 2.0 mm, preferably approximately 0.5 mm. Specifically, the annular gap space 18 is configured of a cylindrical gap that is formed between the inner peripheral surface 5B of the rotational shaft 5 and the outer peripheral surface 17B of the feed tube 17, and is provided over an entire length of the rotational shaft 5. Therefore, in a case where a part of turbine air or exhaust air discharged from bearing air flows out into the annular gap space 18, this air is supposed to flow in the arrow C2 direction toward the rotary atomizing head 16.

Indicated at 19 is the shaping air ring that is provided in the front side of the housing 2. The shaping air ring 19 is mounted to a front end position of the tubular section 2A of the housing 2, and an atomizing head accommodating hole 19A is formed in an axis center position of the shaping air ring 19 to insert the rotary atomizing head 16 and the rotational shaft 5 therein. Many pieces of air ejecting holes 19B (refer to FIG. 5) open side by side in the circumferential direction in the shaping air ring 19 in such a manner as to surround the rotary atomizing head 16. Each of the air ejecting holes 19B is connected to an air pressure source (not shown) through the shaping air supply lines 24 which will be described later.

Here, the shaping air ring 19 adjusts a spraying pattern of the paint sprayed from the paint releasing edge 16A3 of the rotary atomizing head 16 to become a desired spraying pattern by ejecting shaping air supplied through the shaping air supply line 24 from the respective air ejecting holes 19B.

The turbine air supply line 20 is provided in the housing 2, and the turbine air supply line 20 causes turbine air (compressed air) to flow toward the turbine 6 in the air motor 3 in the arrow B1 direction. The turbine air supply line 20 has a base end that is connected to the air pressure source, and a front end that is communicated with the air supply passage 14A in the turbine air passage 14 provided in the air motor 3.

The turbine air discharge line 21 is provided in the housing 2, and the turbine air discharge line 21 discharges exhaust air, which has driven the turbine 6, outside of the housing 2 in the arrow B4 direction. The turbine air discharge line 21 has an inflow side that is communicated with the air discharge passage 14B in the turbine air passage 14 provided in the air motor 3, and an outflow side that opens to, for example, an atmosphere.

The bearing air supply line 22 is provided in the bottom section 2B of the housing 2, and the bearing air supply line 22 supplies bearing air (compressed air) toward the bearing air passage 15 in the arrow A1 direction. The bearing air supply line 22 has a base end that is connected to an air pressure source (not shown) such as a compressor and the like and a front end that is communicated with the bearing air passage 15.

The paint line 23 is provided in an axis center position of the bottom section 2B forming part of the housing 2. The paint line 23 has a base end that is connected to a paint supply source (not shown) such as a paint tank and a color changing valve device and the like, and a front end that is communicated with the paint passage 17A in the feed tube 17.

The shaping air supply line 24 is provided in the housing 2. The shaping air supply line 24 is a line in which compressed air flows toward the respective air ejecting holes 19B in the shaping air ring 19, and is connected to the air pressure source.

Here, a part of the turbine air supplied from the air supply passage 14A in the turbine air passage 14 and the exhaust air discharged from the rear thrust air bearing 12 flow out into the annular gap space 18 through the rear thrust gap 13 (refer to arrow C1), and flow forward toward the rotary atomizing head 16, that is, in the arrow C2 direction in the annular gap space 18. In this manner, in case air flows in the arrow C2 direction in the annular gap space 18, this air flows in an arrow C5 direction shown in a dotted line into the rotary atomizing head 16. If the air flows into the rotary atomizing head 16, the air comes to be mixed in paint supplied from the paint passage 17A in the feed tube 17 to generate a coating failure. In addition, in a case where the paint left without being washed is attached on the inside of the rotary atomizing head 16, there is a possibility that the attached paint is scratched off by the air into small pieces which may come to be mixed in the paint, which also generates a coating failure.

Therefore, in the present embodiment, the air outflow holes 25 are provided in a front end side of the rotational shaft 5 for discharging the air, which flows forward toward the rotary atomizing head 16 in the annular gap space 18, outside of the rotational shaft 5. Description will be made of the configuration of the air outflow hole 25.

That is, the air outflow holes 25 are provided in the front end side of the rotational shaft 5. The air outflow hole 25 discharges the exhaust air, which is composed of a part of the turbine air and the bearing air which flow forward (arrow C2 direction) toward the rotary atomizing head 16 in the annular gap space 18, outside of the rotational shaft 5, that is, in the arrow C3 direction in a position behind the rotary atomizing head 16. The air outflow hole 25 is arranged between the front surface 8C of the radial air bearing 8 and the rear end 16A6 of the atomizing head body 16A forming the rotary atomizing head 16.

Figure 5:
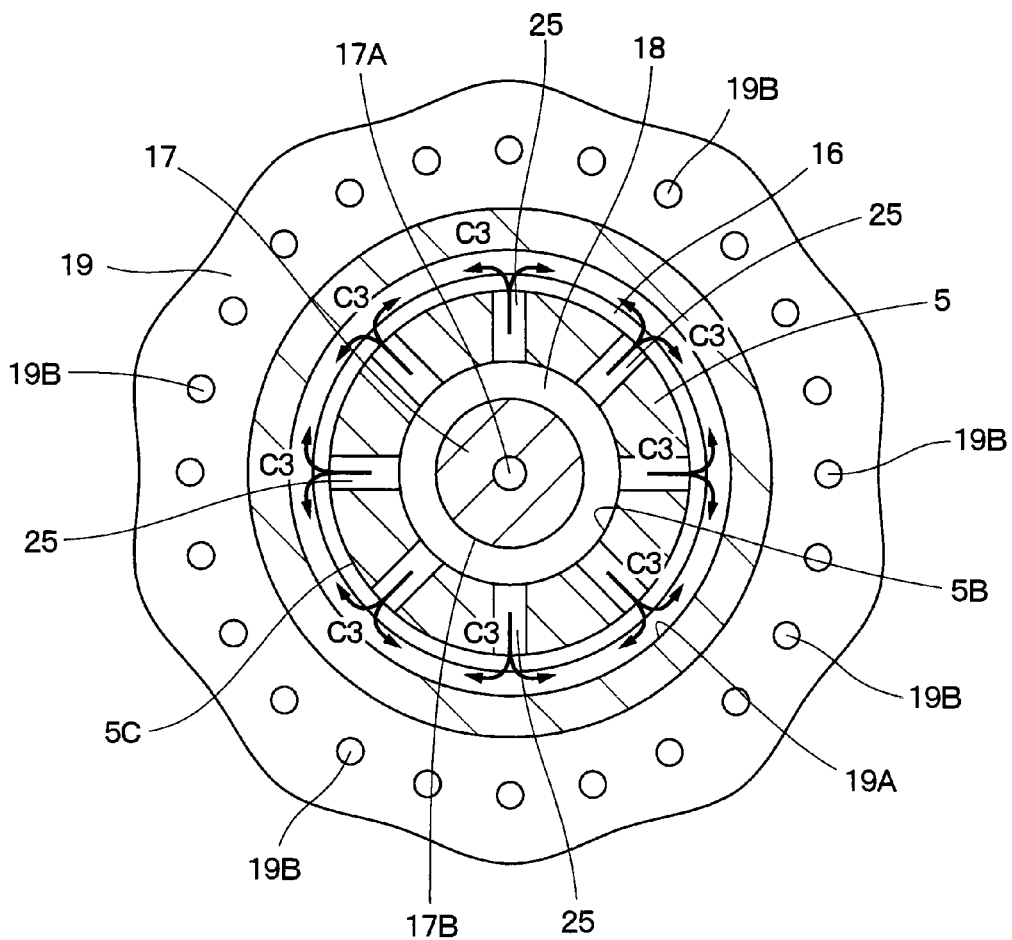
FIG. 5 is a transverse sectional view showing an essential part of the rotary atomizing head type coating machine as viewed in the direction of arrows V-V in FIG. 4.
Figure 6:
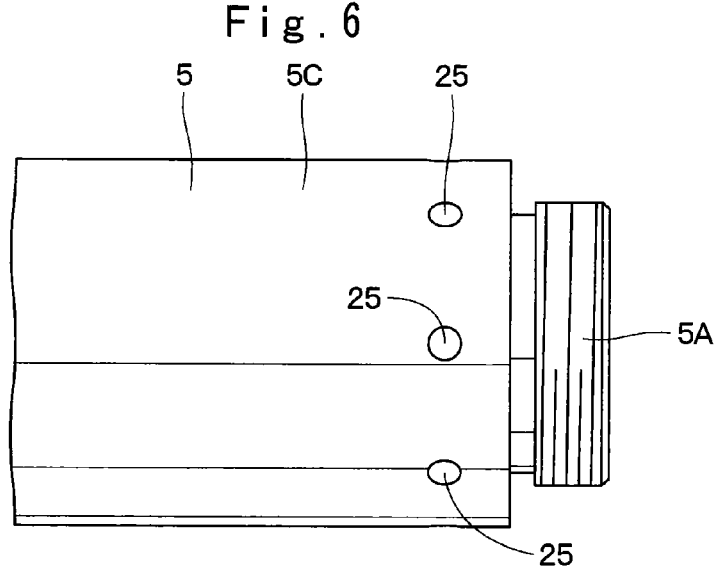
FIG. 6 is an enlarged external view showing an essential part of a front end side of a rotational shaft in which air outflow holes are provided as a single unit.

Further, as shown in FIG. 5 and FIG. 6, the air outflow hole 25 is formed as a circular hole radially extending in such a manner as to penetrate from the inner peripheral surface 5B as the inner diameter side of the rotational shaft 5 through the outer peripheral surface 5C as the outer diameter side, and the air outflow holes 25 are arranged in a plurality of locations, for example, eight locations in the rotational shaft 5 to be spaced with each other in the circumferential direction. In this way, with the eight air outflow holes 25 provided in the circumferential direction, the exhaust air flowing in the annular gap space 18 toward the rotary atomizing head 16 can efficiently flow out through the eight air outflow holes 25 outside of the rotational shaft 5. It should be noted that one to seven, nine or more air outflow holes 25 may be provided except eight, and the number thereof is appropriately set on conditions of a passage area of the air outflow hole 25, a flow amount per time or a flow speed of air flowing in the annular gap space 18, and the like.

The exhaust air composed of a part of the turbine air and the bearing air flows out into the annular gap space 18 as shown in the arrow C1, and flows forward (arrow C2 direction) toward the rotary atomizing head 16 in the annular gap space 18. In this case, as shown in the arrow C3, a large part of the exhaust air flows out outside of the rotational shaft 5 from the respective air outflow holes 25 in a position behind the rotary atomizing head 16. The exhaust air having flowed outside of the rotational shaft 5 is discharged in the arrow C4 direction outside from a gap between the outer peripheral surface 16A7 of the rotary atomizing head 16 and the atomizing head accommodating hole 19A of the shaping air ring 19. On the other hand, a part of the exhaust air flowing forward in the annular gap space 18 flows toward the rotary atomizing head 16 in the arrow C5 direction without flowing into the respective air outflow holes 25. However, since the amount of the exhaust air flowing toward the rotary atomizing head 16 over the respective air outflow holes 25 is little, a coating failure does not occur.

The rotary atomizing head type coating machine 1 according to the first embodiment has the configuration as described above, and next, an operation of the rotary atomizing head type coating machine 1 at the time of performing a coating work using it will be explained.

The bearing air is supplied through the bearing air supply line 22 and the bearing air passage 15 to the radial thrust air bearing 7 and the rear thrust air bearing 12 of the air motor 3 to rotatably support the rotational shaft 5. On the other hand, the turbine air is supplied through the turbine air supply line 20 and the air supply passage 14A in the turbine air passage 14 toward the turbine 6 in the air motor 3 to rotate the turbine 6. Therefore, the rotary atomizing head 16 is rotated together with the rotational shaft 5 at high speeds. In this state, the paint selected in the color changing valve device is supplied through the paint line 23 and the paint passage 17A in the feed tube 17 to the rotary atomizing head 16, and thereby the paint can be sprayed as atomized paint particles from the rotary atomizing head 16.

At this time, by applying high voltages to the paint (paint particles) by a high-voltage generator, the paint particles charged the high-voltage fly toward a painting object connected to earth to efficiently perform the coating thereon. Further, the shaping air ring 19 can adjust a spraying pattern of the paint sprayed from the rotary atomizing head 16 to a desired spraying pattern by ejecting the shaping air supplied from the shaping air supply line 24 from each of the air ejecting holes 19B.

A large part of the turbine air supplied in the arrow B2 direction from the air supply passage 14A toward the turbine 6 in the air motor 3 rotates the impeller 6C as shown in the arrow B3. The exhaust air having rotated the impeller 6C goes through the turbine accommodating chamber 4C, flows in the arrow B4 direction in the air discharge passage 14B, and is discharged outside from the turbine air discharge line 21. On the other hand, a part of the turbine air supplied in the arrow B3 direction toward the turbine 6 flows radially inward in the arrow B5 direction in the rear thrust gap 13, flows out into the annular gap space 18 (refer to the arrow C1), and flows forward in the arrow C2 direction in the annular gap space 18.

The bearing air supplied in the arrow A2 direction toward the first passage 15A in the bearing air passage 15 is ejected from the respective radial air ejecting holes 8E in the radial air bearing 8 to the annular radial gap 10. The bearing air forms an air layer in the annular radial gap 10, and thereafter becomes exhaust air. A part of the exhaust air flows forward in the arrow A3 direction in the annular radial gap 10, and flows in the arrow C4 direction in the gap between the outer peripheral surface 16A7 of the rotary atomizing head 16 and the atomizing head accommodating hole 19A of the shaping air ring 19 to be discharged outside of the coating machine 1. On the other hand, the rest of the exhaust air flows backward in the arrow A4 direction in the annular radial gap 10, and flows in the arrow B4 direction from the air discharge passage 14B through the respective air release holes 8F as shown in the arrow A5 to be discharged outside of the coating machine 1. Further, among the bearing air, the bearing air supplied in the arrow A2 direction toward the front thrust air bearing 9 from the first passage 15A is ejected to the front thrust gap 11 from the respective thrust air ejecting holes 9B. This bearing air flows radially outside in the arrow A6 direction in the front thrust gap 11 to be discharged outside from the air discharge passage 14B (refer to the arrow B4).

Further, the bearing air having flowed in the arrow A7 direction toward the second passage 15B in the bearing air passage 15 is supplied to the rear thrust air bearing 12. This bearing air is ejected from the respective thrust air ejecting holes 12B to the rear thrust gap 13, forms an air layer in the rear thrust gap 13, and thereafter becomes exhaust air. The exhaust air flows radially inward in the rear thrust gap 13, flows out into the annular gap space 18 as shown in the arrow C1, and flows forward in the arrow C2 direction in the annular gap space 18.

Here, as described above, a part of the exhaust air at the time of supplying the turbine air from the air supply passage 14A in the turbine air passage 14 to the turbine 6 or the exhaust air discharged from the thrust air ejecting hole 12B in the rear thrust air bearing 12 flows out into the annular gap space 18 formed between the rotational shaft 5 and the feed tube 17. In this manner, the exhaust air having flowed out into the annular gap space 18 as shown in the arrow C1 flows in the arrow C2 direction toward the rotary atomizing head 16 in the annular gap space 18. In this case, if the exhaust air flows into the rotary atomizing head 16 from the annular gap space 18 and this air comes to be mixed in the paint to generate air bubbles in the paint, a coating failure may be occured.

However, according to the first embodiment, the rotational shaft 5 of the air motor 3 is provided with the air outflow holes 25 radially penetrating the rotational shaft 5 to be positioned between the front surface 8C of the radial air bearing 8 arranged on the outer peripheral side of the rotational shaft 5 and the rear end 16A6 of the rotary atomizing head 16. Therefore, the exhaust air flowing in the arrow C2 direction in the annular gap space 18 as described above can flow out outside of the rotational shaft 5 from the air outflow holes 25 as shown in the arrow C3 in a position behind the rotary atomizing head 16.

In this case, since the rotational shaft 5 rotates at high speeds to create a radially outside centrifugal force, the exhaust air can be appropriately discharged from the air outflow holes 25 with this centrifugal force. Further, an annular gap space between the outer peripheral surface 16A7 of the atomizing head body 16A in the rotary atomizing head 16 and the atomizing head accommodating hole 19A of the shaping air ring 19 is likely to have a negative pressure by the centrifugal force generated with rotation of the rotary atomizing head 16, therefore, the exhaust air can be efficiently discharged from the air outflow holes 25.

Accordingly, it is possible to prevent the exhaust air of the turbine air and the bearing air from coming to be mixed in the paint ejected from the feed tube 17. Further, in a case where the paint left without being washed is attached to the front end side of the feed tube 17, it is possible to prevent this attached paint from being scratched off to come to be mixed in the paint. As a result, occurrence of a coating failure due to the exhaust air or the small pieces of the attached paint coming to be mixed in the paint can be suppressed. Therefore, reliability and coating efficiency on the rotary atomizing head type coating machine 1 can be improved.

On the other hand, the air outflow holes 25 are arranged in a plurality of locations, for example, eight locations in the rotational shaft 5 to have intervals in the circumferential direction from each other. Therefore, a large passage area can be obtained by summing the passage areas of the respective air outflow holes 25. Accordingly, since the exhaust air flowing in the annular gap space 18 can simply flow in the respective air outflow holes 25 having the large passage area, a large deal of the exhaust air can efficiently flow out outside of the rotational shaft 5 from the annular gap space 18.

Figure 7:
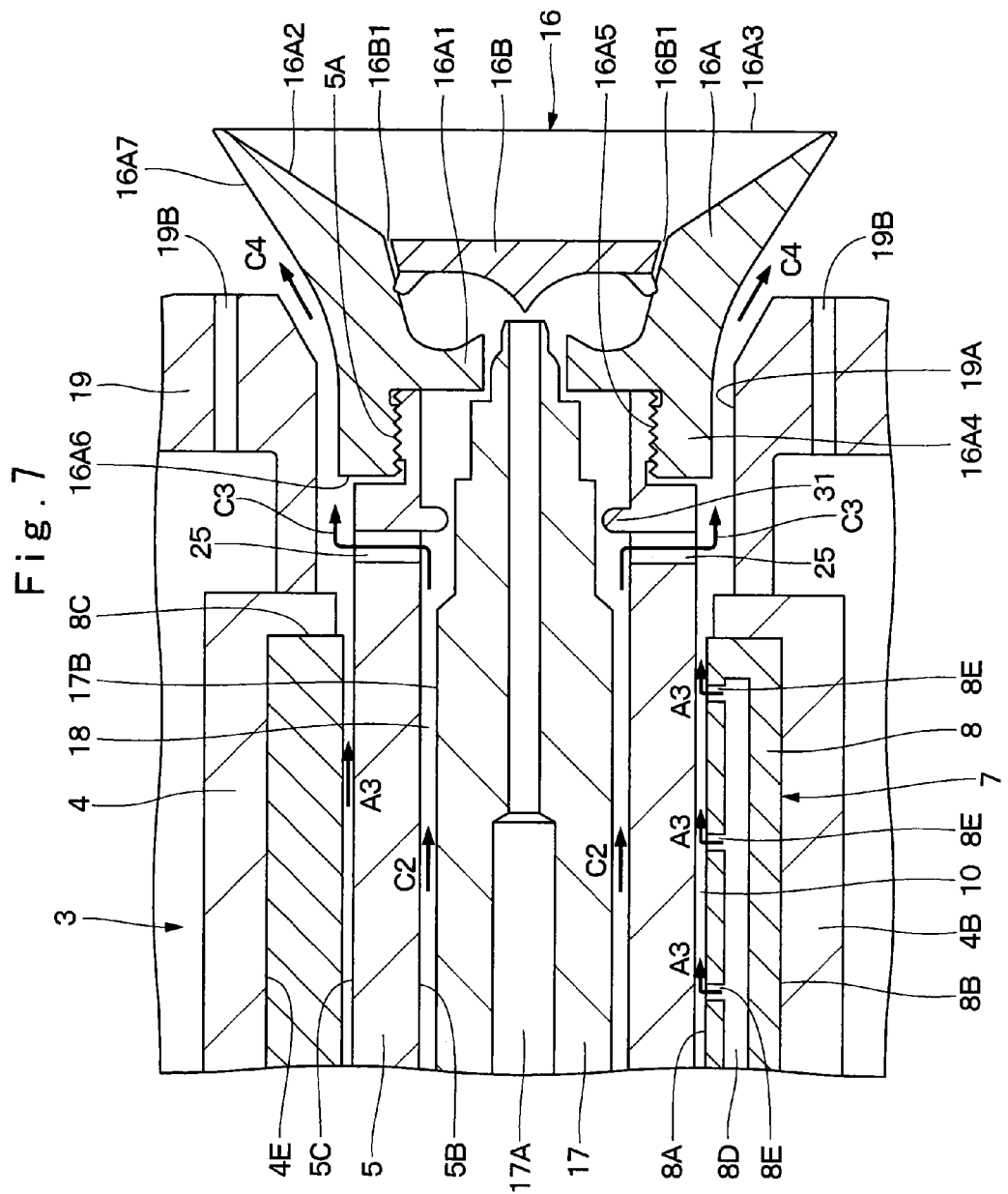
FIG. 7 is an enlarged longitudinal sectional view showing an essential part of a rotary atomizing head type coating machine according to a second embodiment in the present invention.

Next, FIG. 7 shows a second embodiment of the present invention. The present embodiment is characterized by providing an annular projecting portion that radially projects to partition an annular gap space on an inner peripheral surface of a rotational shaft in a position closer to a rotary atomizing head than a position of an air outflow hole. It should be noted that in the second embodiment, the component elements that are identical to those of the aforementioned first embodiment will be simply denoted by the same reference numerals to avoid repetitions of similar explanations.

In FIG. 7, designated at 31 is an annular projecting portion that is provided on the inner peripheral surface 5B of the rotational shaft 5. The annular projecting portion 31 is formed to radially inward project in a front side position closer to the rotary atomizing head 16 than a position of each of the air outflow holes 25. Here, the annular projecting portion 31 is formed as an annular partition wall in such a manner that an inner diameter end has a slight gap to the outer peripheral surface 17B of the feed tube 17. Thereby, the annular projecting portion 31 can partition the annular gap space 18 between each of the air outflow holes 25 and the rotary atomizing head 16. Accordingly, the annular projecting portion 31 partitioning the annular gap space 18 can introduce exhaust air flowing in the arrow C2 direction in the annular gap space 18 to each of the air outflow holes 25.

Thus, also in the second embodiment as configured in this manner, an operational effect substantially similar to that in the first embodiment described before can be obtained. In particular, according to the second embodiment, the annular projecting portion 31 that radially inward projects is provided on the inner peripheral surface 5B of the rotational shaft 5 in the position closer to the rotary atomizing head 16 than the position of each of the air outflow holes 25. Accordingly, the annular projecting portion 31 can block the air flowing toward the rotary atomizing head 16 over each of the air outflow holes 25 in the annular gap space 18. As a result, as shown in the arrow C3, the annular projecting portion 31 can positively introduce the exhaust air to each of the air outflow holes 25 to improve exhaust performance of the air.

Figure 8:
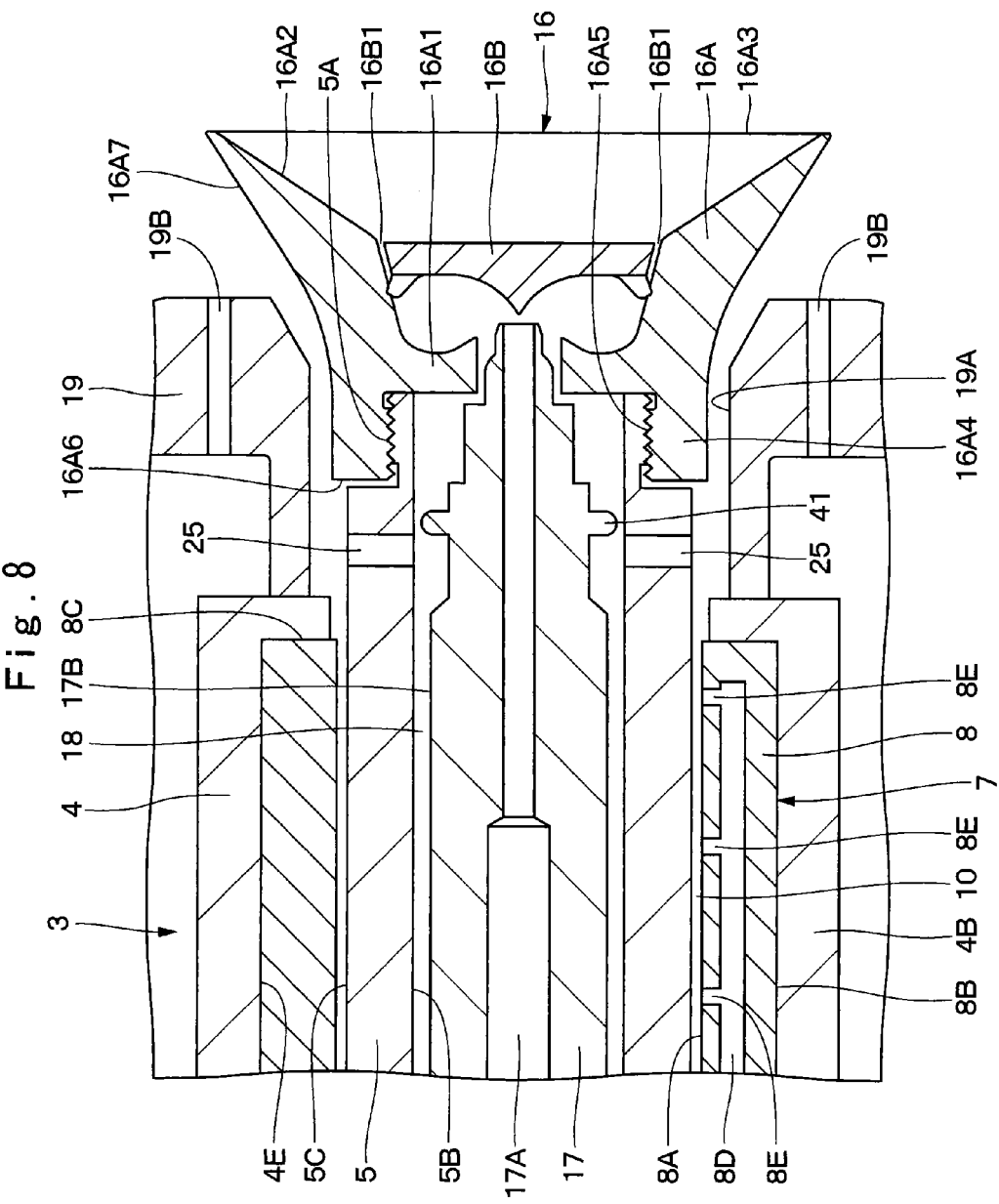
FIG. 8 is an enlarged longitudinal sectional view showing an essential part of a rotary atomizing head type coating machine according to a third embodiment in the present invention.

Next, FIG. 8 shows a third embodiment of the present invention. The present embodiment is characterized by providing an annular projecting portion that radially projects to partition an annular gap space on an outer peripheral surface of a feed tube in a position closer to a rotary atomizing head than a position of an air outflow hole. It should be noted that in the third embodiment, the component elements that are identical to those of the aforementioned first embodiment will be simply denoted by the same reference numerals to avoid repetitions of similar explanations.

In FIG. 8, designated at 41 is an annular projecting portion that is provided on the outer peripheral surface 17B of the feed tube 17. The annular projecting portion 41 is formed to radially outward project in a front side position closer to the rotary atomizing head 16 than a position of each of the air outflow holes 25. Here, the annular projecting portion 41 is formed as an annular partition wall in such a manner that an outer diameter end has a slight gap to the inner peripheral surface 5B of the rotational shaft 5. Thereby, the annular projecting portion 41 can partition the annular gap space 18 between each of the air outflow holes 25 and the rotary atomizing head 16. Accordingly, the annular projecting portion 41 partitioning the annular gap space 18 can introduce exhaust air flowing in the annular gap space 18 to each of the air outflow holes 25.

Thus, also in the third embodiment as configured in this manner, an operational effect substantially similar to that in the first embodiment described before can be obtained. In particular, according to the third embodiment, the annular projecting portion 41 that radially outward projects is provided on the outer peripheral surface 17B of the feed tube 17 in the position closer to the rotary atomizing head 16 than the position of each of the air outflow holes 25. Accordingly, the annular projecting portion 41 can block the exhaust air flowing toward the rotary atomizing head 16 over each of the air outflow holes 25 in the annular gap space 18. As a result, the annular projecting portion 41 can positively introduce the exhaust air to each of the air outflow holes 25.

Figure 9:
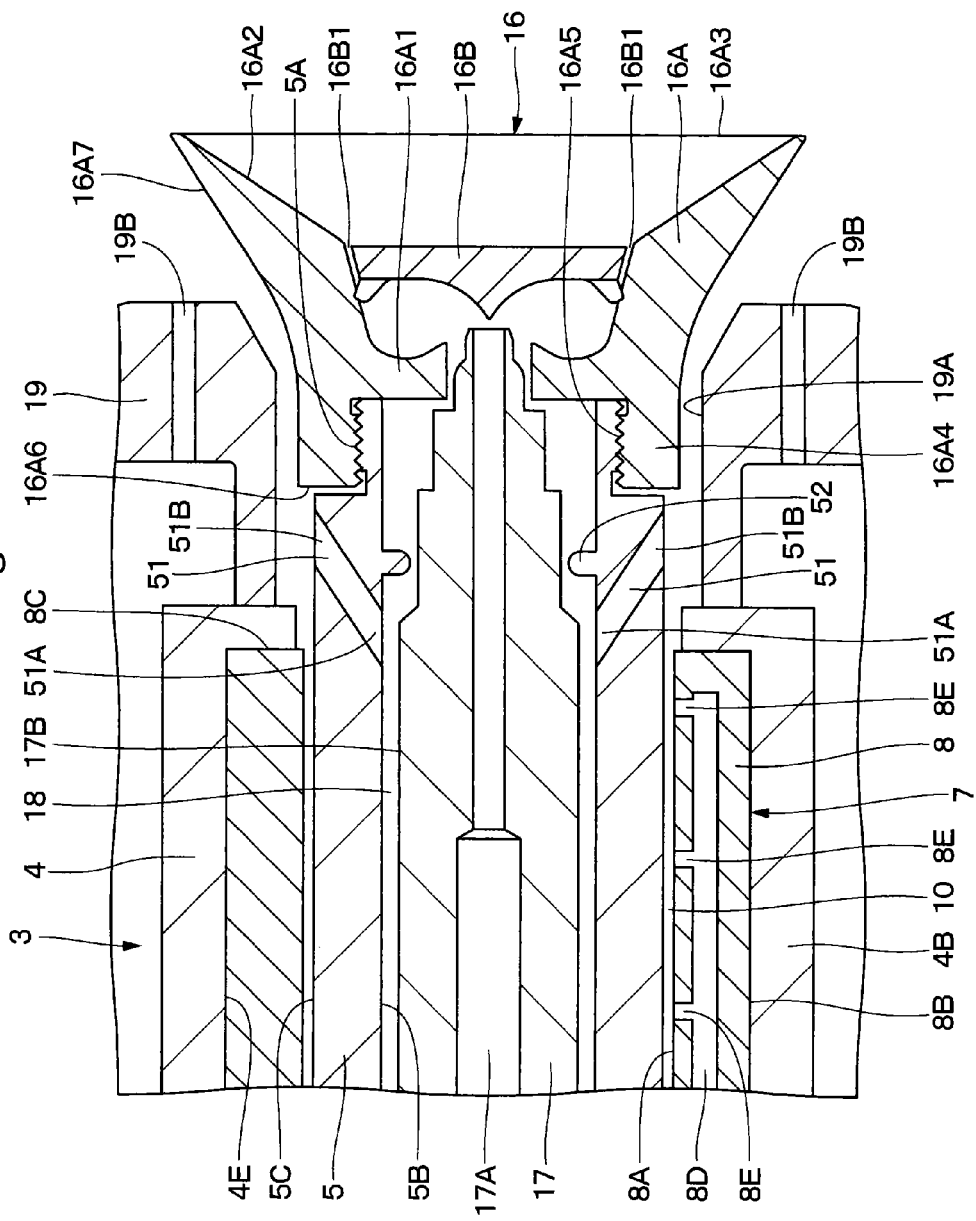
FIG. 9 is an enlarged longitudinal sectional view showing an essential part of a rotary atomizing head type coating machine according to a fourth embodiment in the present invention.

Next, FIG. 9 shows a fourth embodiment of the present invention. The present embodiment is characterized by being configured such that air outflow holes each are formed to be inclined in such a manner that an opening end opened to an outer peripheral surface of a rotational shaft is positioned closer to the axial front side than an opening end opened to an inner peripheral surface thereof, and an annular projecting portion that radially projects to partition an annular gap space is provided on the inner peripheral surface of the rotational shaft in a position closer to a rotary atomizing head than a position of the air outflow hole. It should be noted that in the fourth embodiment, the component elements that are identical to those of the aforementioned first embodiment will be simply denoted by the same reference numerals to avoid repetitions of similar explanations.

In FIG. 9, designated at 51 are air outflow holes that are provided in the front end side of the rotational shaft 5 according to the fourth embodiment. The plurality of air outflow holes 51 are, as substantially similar to the air outflow holes 25 in the aforementioned first embodiment, arranged between the front surface 8C of the radial air bearing 8 and the rear end 16A6 of the rotary atomizing head 16 and radially extend to be bored through from the inner peripheral surface 5B to the outer peripheral surface 5C of the rotational shaft 5.

However, each of the air outflow holes 51 according to the fourth embodiment differs in a point of being formed to be inclined in such a manner that an opening end 51B opened to the outer peripheral surface 5C of the rotational shaft 5 is positioned closer to the axial front side than an opening end 51A opened to the inner peripheral surface 5B thereof, from the air outflow holes 25 according to the first embodiment.

In this way, each of the air outflow holes 51 is formed to be inclined to the side of the rotary atomizing head 16 from the inner peripheral surface 5B of the rotational shaft 5 toward the outer peripheral surface 5C of the rotational shaft 5. Therefore, each of the air outflow holes 51 can be formed at a gradual angle to the exhaust air flowing toward the rotary atomizing head 16 in the annular gap space 18 to cause the exhaust air to smoothly flow into the opening end 51A opened to the inner peripheral surface 5B.

Designated at 52 is an annular projecting portion that is provided on the inner peripheral surface 5B of the rotational shaft 5. The annular projecting portion 52 is formed to radially inward project in a position closer to the rotary atomizing head 16 than a position of the opening end 51A into which the exhaust air flows in each of the air outflow holes 51. Here, the annular projecting portion 52 is formed as an annular partition wall in such a manner that an inner diameter end has a slight gap to the outer peripheral surface 17B of the feed tube 17. Thereby, the annular projecting portion 52 can partition the annular gap space 18 between each of the air outflow holes 51 and the rotary atomizing head 16. Accordingly, the annular projection portion 52 partitioning the annular gap space 18 can introduce the exhaust air flowing in the annular gap space 18 to each of the air outflow holes 51.

Thus, also in the fourth embodiment as configured in this manner, an operational effect substantially similar to that in the first embodiment described before can be obtained. In particular, according to the fourth embodiment, each of the air outflow holes 51 is formed to be inclined in such a manner that the opening end 51B opened to the outer peripheral surface 5C of the rotational shaft 5 is positioned closer to the axial front side than the opening end 51A opened to the inner peripheral surface 5B thereof. Therefore, each of the inclined air outflow holes 51 enables the exhaust air to smoothly flow into the inside opening end 51A and smoothly flow out from the outside opening end 51B. As a result, it is possible for the exhaust air to efficiently flow out from the annular gap space 18 outside of the rotational shaft 5.

Further, the annular projecting portion 52 that radially inward projects is provided on the inner peripheral surface 5B of the rotational shaft 5 in the position closer to the rotary atomizing head 16 than the position of the opening end 51A of each of the air outflow holes 51. Accordingly, the annular projecting portion 52 can block the air flowing to the side of the rotary atomizing head 16 over the opening end 51A of each of the air outflow holes 25 in the annular gap space 18 and therefore, the annular projecting portion 52 can positively introduce the exhaust air to each of the air outflow holes 51. It should be noted that the annular projecting portion may be provided on the outer peripheral surface 17B of the feed tube 17, or may be provided in each of the rotational shaft 5 and the feed tube 17.

Figure 10:
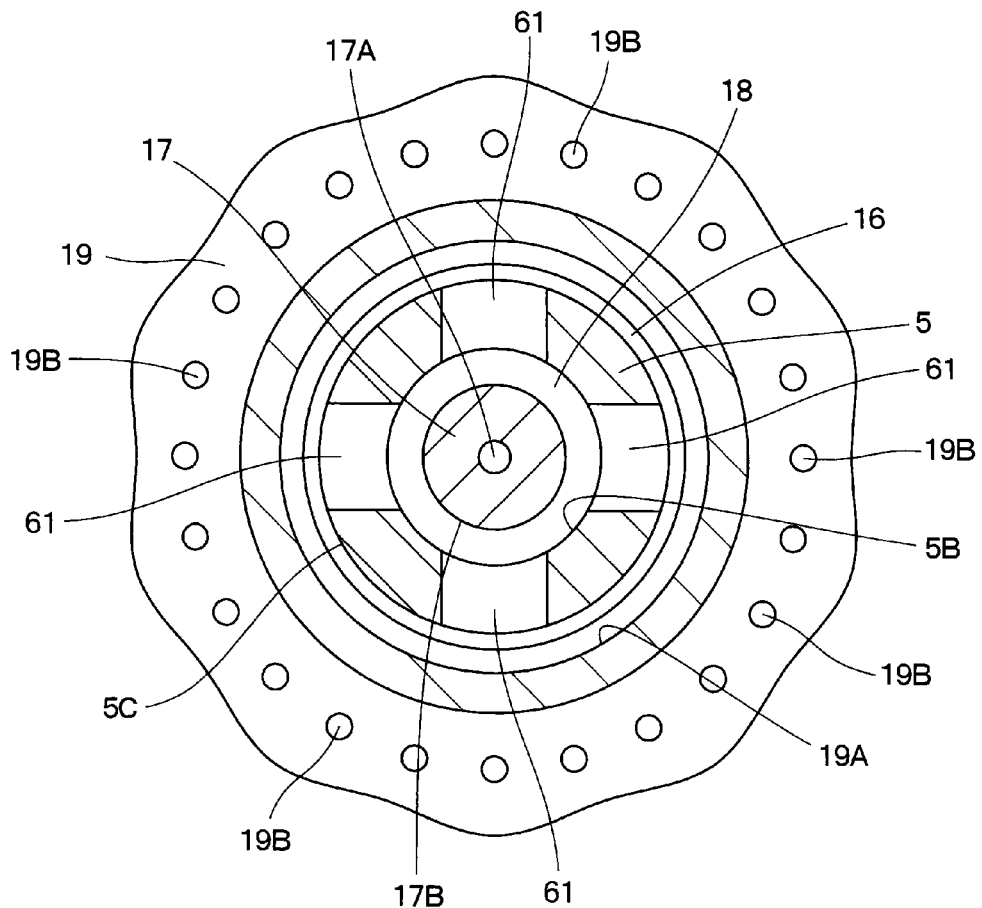
FIG. 10 is a transverse sectional view showing an essential part of a rotary atomizing head type coating machine according to a fifth embodiment in the present invention as viewed from a position similar to that of FIG. 5.
Figure 11:
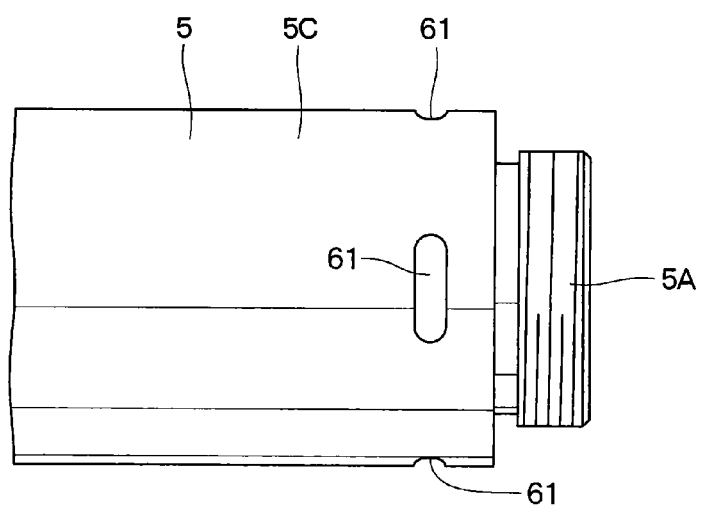
FIG. 11 is an enlarged external view showing an essential part of a front side of a rotational shaft in which air outflow holes are provided as a single unit according to the fifth embodiment.

Next, FIG. 10 and FIG. 11 show a fifth embodiment of the present invention. The present embodiment is characterized in a point where air outflow holes each are formed in a slit shape in a rotational shaft to be wide in width in the circumferential direction of the rotational shaft. It should be noted that in the fifth embodiment, the component elements that are identical to those of the aforementioned first embodiment will be simply denoted by the same reference numerals to avoid repetitions of similar explanations.

In FIG. 10 and FIG. 11, designated at 61 are air outflow holes that are provided in the front end side of the rotational shaft 5 according to the fifth embodiment. The plurality of air outflow holes 61 are, as substantially similar to the air outflow holes 25 in the aforementioned first embodiment, arranged between the front surface 8C of the radial air bearing 8 and the rear end 16A6 of the rotary atomizing head 16 and radially extend to penetrate from the inner peripheral surface 5B of the rotational shaft 5 to the outer peripheral surface 5C thereof. However, each of the air outflow holes 61 according to the fifth embodiment differs in a point of being formed in the slit shape to be wide in width in the circumferential direction of the rotational shaft 5, from the air outflow hole 25 according to the first embodiment.

Thus, also in the fifth embodiment configured in this way, an operational effect as substantially similar to that of the aforementioned first embodiment can be obtained. Particularly, according to the fifth embodiment, since each of the air outflow holes 61 is formed in the slit shape to be wide in width in the circumferential direction of the rotational shaft 5, a passage area of the air outflow hole 61 can be made large to cause the exhaust air to positively flow out outside of the rotational shaft 5 from the annular gap space 18.

Figure 12:
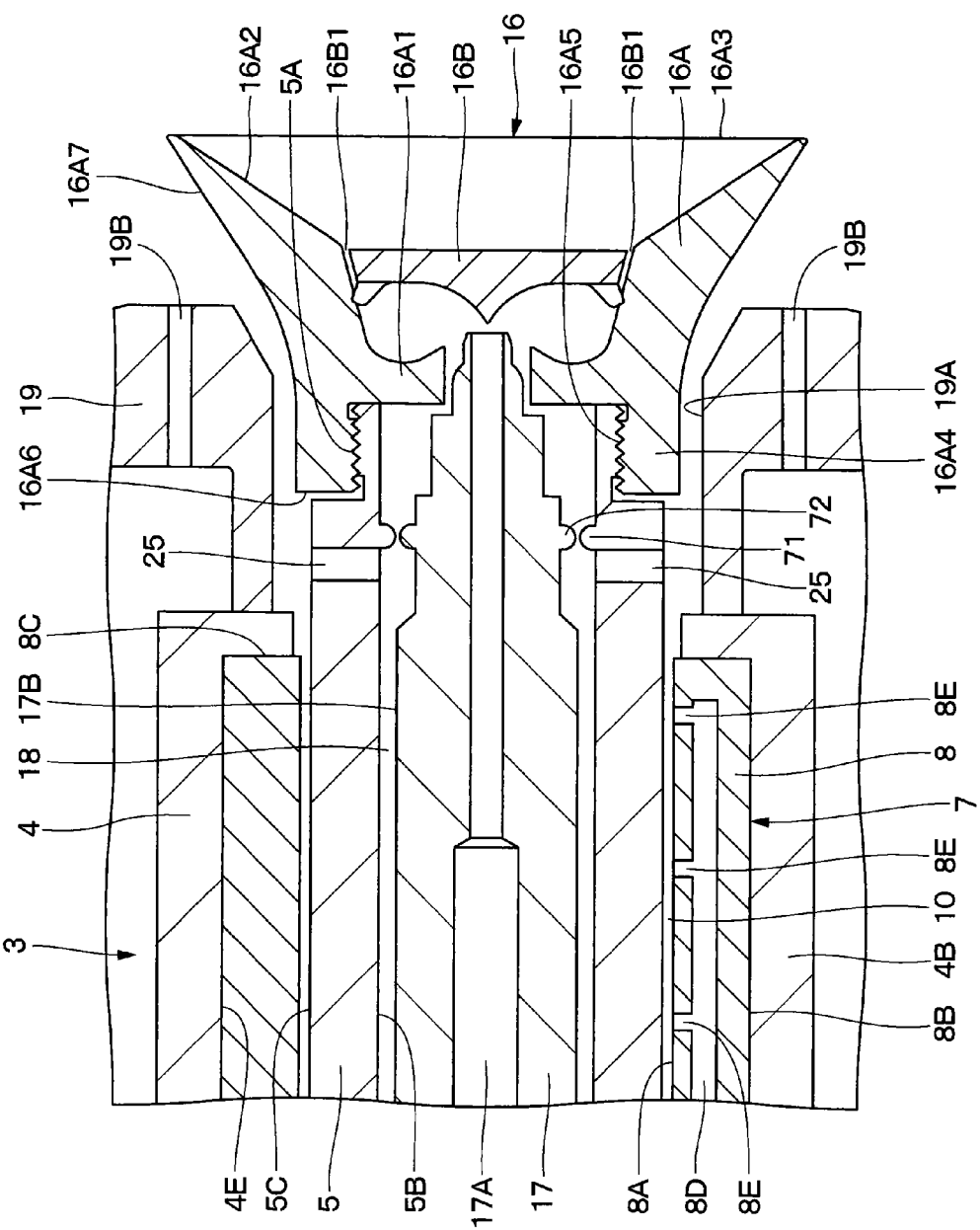
FIG. 12 is an enlarged longitudinal sectional view showing an essential part of a rotary atomizing head type coating machine according to a sixth embodiment in the present invention.

Next, FIG. 12 shows a sixth embodiment of the present invention. The present embodiment is characterized by providing an annular projecting portion that radially projects to partition an annular gap space on each of an inner peripheral surface of a rotational shaft and an outer peripheral surface of a feed tube in a position closer to a rotary atomizing head than a position of an air outflow hole. It should be noted that in the sixth embodiment, the component elements that are identical to those of the aforementioned first embodiment will be simply denoted by the same reference numerals to avoid repetitions of similar explanations.

In FIG. 12, an outer annular projecting portion 71 is provided on the inner peripheral surface 5B of the rotational shaft 5. This outer annular projecting portion 71 is formed to radially inward project in a position closer to the rotary atomizing head 16 than in a position of each of the air outflow holes 25.

On the other hand, an inner annular projecting portion 72 is provided on the outer peripheral surface 17B of the feed tube 17 to face the inside of the outer annular projecting portion 71. This inner annular projecting portion 72 is formed to radially outward project in a position closer to the rotary atomizing head 16 than in a position of each of the air outflow holes 25.

Here, the respective annular projecting portions 71, 72 are arranged to be close to each other with a slight gap therebetween. Therefore, the respective annular projecting portions 71, 72 can partition the annular gap space 18 between each of the air outflow holes 25 and the rotary atomizing head 16. As a result, the respective annular projecting portions 71, 72 partitioning the annular gap space 18 can introduce the exhaust air flowing in the annular gap space 18 to each of the air outflow holes 25.

Thus, also in the sixth embodiment configured in this way, an operational effect as substantially similar to that of the aforementioned first embodiment can be obtained. Particularly, according to the sixth embodiment, the outer annular projecting portion 71 that radially inward projects is provided on the inner peripheral surface 5B of the rotational shaft 5 in the position closer to the rotary atomizing head 16 than in the position of each of the air outflow holes 25. Further, the inner annular projecting portion 72 that radially outward projects is provided on the outer peripheral surface 17B of the feed tube 17 in a position in the inner diameter side of the outer annular projecting portion 71. As a result, the respective annular projecting portions 71, 72 can positively introduce the exhaust air to each of the air outflow holes 25 by blocking the exhaust air flowing to the side of the rotary atomizing head 16 over each of the air outflow holes 25 in the annular gap space 18.

Figure 13:
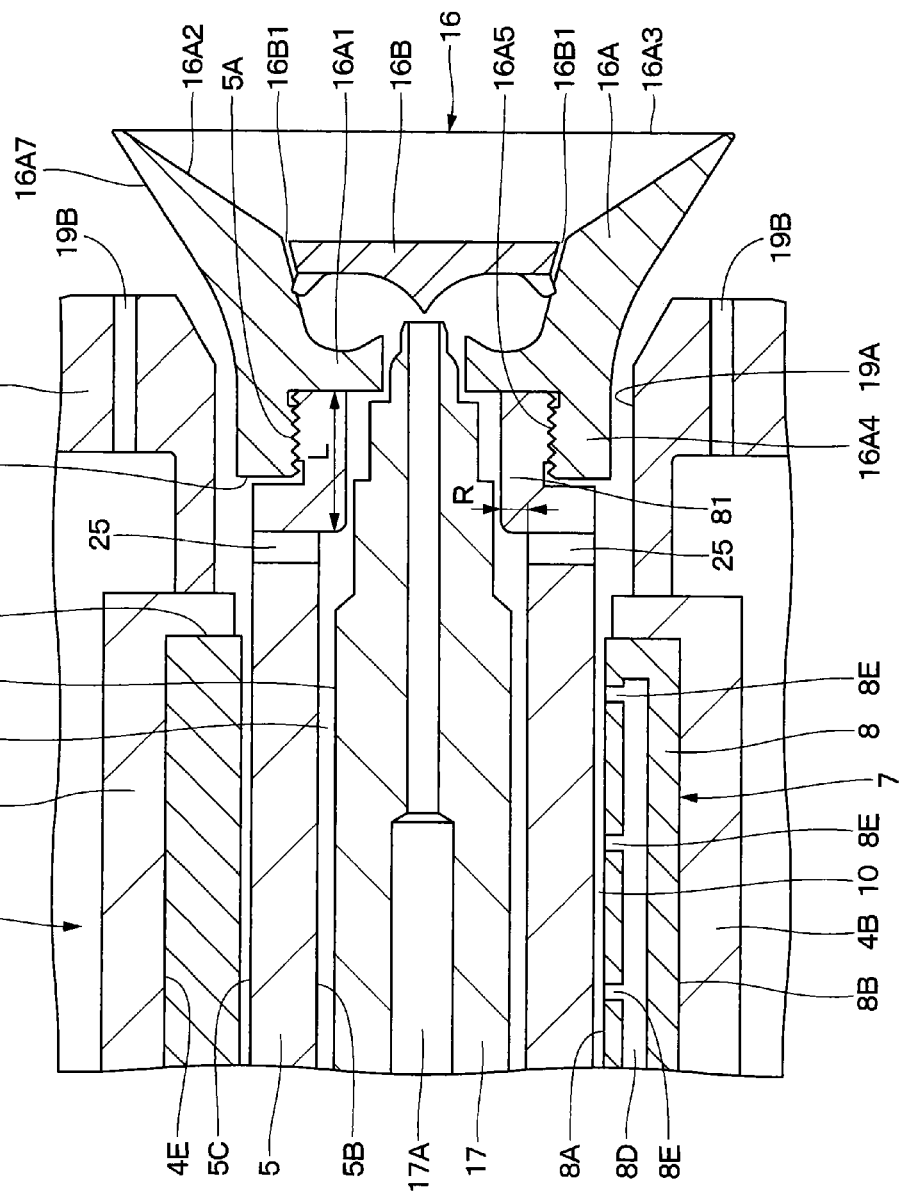
FIG. 13 is an enlarged longitudinal sectional view showing an essential part of a rotary atomizing head type coating machine according to a seventh embodiment in the present invention.

Next, FIG. 13 shows a seventh embodiment of the present invention. The present embodiment is characterized by providing an annular projecting portion that radially projects to partition an annular gap space on an inner peripheral surface of a rotational shaft in an axially wide range closer to a rotary atomizing head than a position of the air outflow hole. It should be noted that in the seventh embodiment, the component elements that are identical to those of the aforementioned first embodiment will be simply denoted by the same reference numerals to avoid repetitions of similar explanations.

In FIG. 13, an annular projecting portion 81 is provided on the inner peripheral surface 5B of the rotational shaft 5. This annular projecting portion 81 is formed as an axially wide projecting portion that radially inward projects in a position closer to the rotary atomizing head 16 than in a position of each of the air outflow holes 25, that is, over a range from the air outflow hole 25 to a front end of the rotational shaft 5. The annular projecting portion 81 projects to the inner diameter side from the inner peripheral surface 5B of the rotational shaft 5 by a diameter dimension R, and continuously projects to the front end of the rotational shaft 5 by a length dimension L. Here, the annular projecting portion 81 is formed as an annular partition wall in such a manner that the inner peripheral surface has a slight gap to the outer peripheral surface 17B of the feed tube 17. Therefore, the annular projecting portion 81 can partition the annular gap space 18 between the each of the air outflow holes 25 and the rotary atomizing head 16. Accordingly, the annular projecting portion 81 partitioning the annular gap space 18 can introduce the exhaust air flowing in the annular gap space 18 to each of the air outflow holes 25.

Thus, also in the seventh embodiment configured in this way, an operational effect as substantially similar to that of the aforementioned first embodiment can be obtained. Particularly, according to the seventh embodiment, the annular projecting portion 81 that radially inward projects is provided on the inner peripheral surface 5B of the rotational shaft 5 in the wide range (range of a length dimension L) from each of the air outflow holes 25 to the front end of the rotational shaft 5. Accordingly, the axially wide annular projecting portion 81 can positively introduce the exhaust air to each of the air outflow holes 25 by efficiently partitioning the annular gap space 18 with a long distance.

Figure 14:
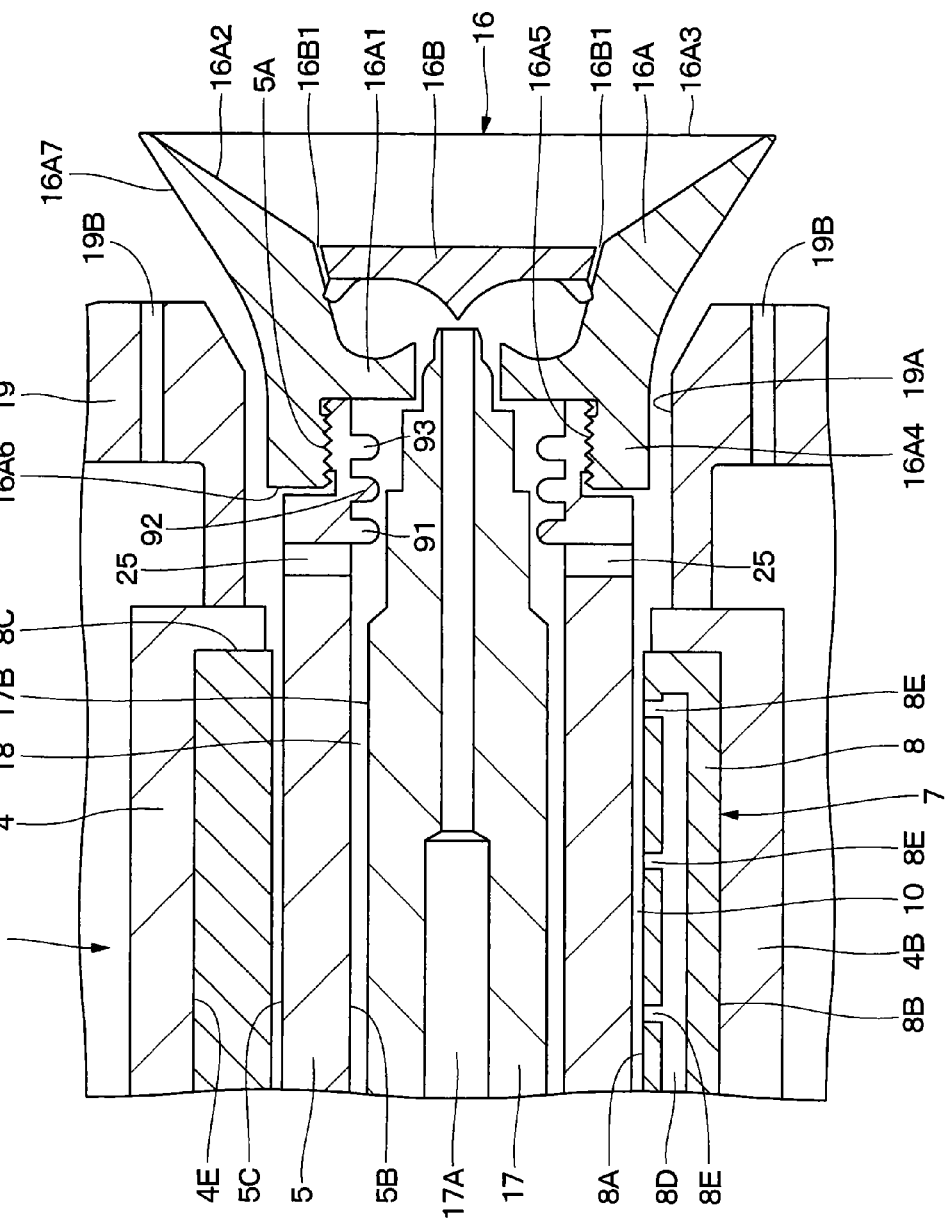
FIG. 14 is an enlarged longitudinal sectional view showing an essential part of a rotary atomizing head type coating machine according to an eighth embodiment in the present invention.

Next, FIG. 14 shows an eighth embodiment of the present invention. The present embodiment is characterized by providing a plurality of annular projecting portions that radially project to partition an annular gap space on an inner peripheral surface of a rotational shaft in a position closer to a rotary atomizing head side than a position of an air outflow hole. It should be noted that in the eighth embodiment, the component elements that are identical to those of the aforementioned first embodiment will be simply denoted by the same reference numerals to avoid repetitions of similar explanations.

In FIG. 14, designated at 91, 92, 93 are three annular projecting portions that are provided on the inner peripheral surface 5B of the rotational shaft 5. The three annular projecting portions 91, 92, 93 are arranged to be axially spaced from each other in a position closer to the rotary atomizing head 16 than a position of each of the air outflow holes 25. Each of the annular projecting portions 91, 92, 93 is formed to radially inward project. Here, each of the annular projecting portions 91, 92, 93 is formed as an annular partition wall an inner diameter end of which has a slight gap to the outer peripheral surface 17B of the feed tube 17. Therefore, the annular projecting portions 91, 92, 93 can partition the annular gap space 18 between the each of the air outflow holes 25 and the rotary atomizing head 16. Accordingly, the annular projecting portions 91, 92, 93 partitioning the annular gap space 18 can introduce the exhaust air flowing in the annular gap space 18 to each of the air outflow holes 25. It should be noted that the number of the annular projecting portions 91, 92, 93 may be two or more other than four except three.

Thus, also in the eighth embodiment configured in this way, an operational effect as substantially similar to that of the aforementioned first embodiment can be obtained. Particularly, according to the eighth embodiment, the three annular projecting portions 91, 92, 93 that radially inward project are provided to axially line up on the inner peripheral surface 5B of the rotational shaft 5 in the position closer to the rotary atomizing head 16 than the position of each of the air outflow holes 25. Accordingly, the annular projecting portions 91, 92, 93 can efficiently partition the annular gap space 18 with a labyrinth effect generated by a three-step arrangement. As a result, each of the annular projecting portions 91, 92, 93 can more positively introduce the exhaust air to each of the air outflow holes 25.

Figure 15:
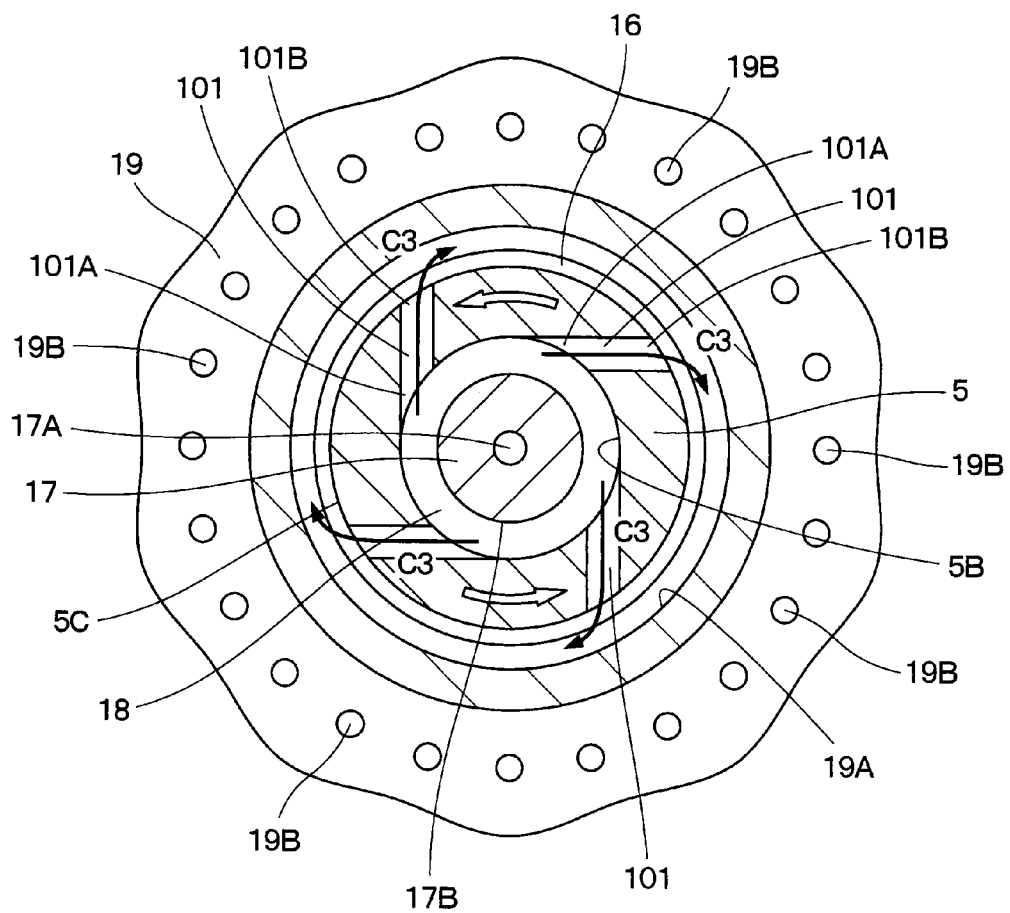
FIG. 15 is a transverse longitudinal sectional view showing an essential part of a rotary atomizing head type coating machine according to a ninth embodiment in the present invention as viewed from a position similar to that of FIG. 5.
Figure 16:
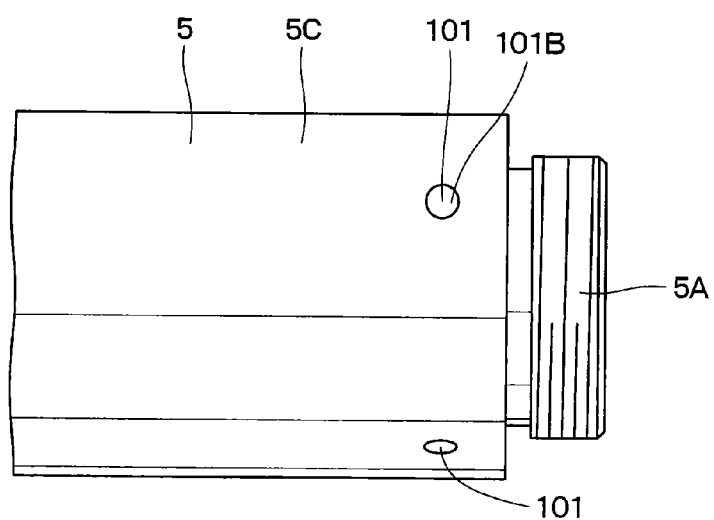
FIG. 16 is an enlarged external view showing an essential part of a front side of a rotational shaft in which air outflow holes are provided as a single unit.

Next, FIG. 15 and FIG. 16 show a ninth embodiment of the present invention. The present embodiment is characterized by forming each of air outflow holes in a position eccentric in a tangential direction of an inner peripheral surface of a rotational shaft. It should be noted that in the ninth embodiment, the component elements that are identical to those of the aforementioned first embodiment will be simply denoted by the same reference numerals to avoid repetitions of similar explanations.

In FIG. 15 and FIG. 16, designated at 101 are air outflow holes that are provided in the front end side of the rotational shaft 5 according to the ninth embodiment. The plurality of air outflow holes 101 are, as substantially similar to the air outflow holes 25 in the aforementioned first embodiment, arranged between the front surface 8C of the radial air bearing 8 and the rear end 16A6 of the rotary atomizing head 16 and extend to penetrate from the inner peripheral surface 5B to the outer peripheral surface 5C of the rotational shaft 5. However, each of the air outflow holes 101 according to the ninth embodiment differs in a point of being formed in the position eccentric in the tangential direction of the inner peripheral surface 5B of the rotational shaft 5 and in a point where four air outflow holes 101 are provided, from the air outflow hole 25 according to the first embodiment. It should be noted that the number of the air outflow holes 101 may be one to three, or more other than five except four.

Here, each of the air outflow holes 101 is a passage for discharging the exhaust air flowing in the annular gap space 18. Accordingly, in a case where the rotational shaft 5 rotates in an outlined arrow direction (counterclockwise) in FIG. 15, each of the air outflow holes 101 is formed to be inclined in a direction (clockwise) in reverse to the rotating direction of the rotational shaft 5. Therefore, by the rotation of the rotational shaft 5, each of the air outflow holes 101 causes the exhaust air flowing in the annular gap space 18 to positively inflow from a large opening end 101A at the inner diameter side and be efficiently discharged outside of the rotational shaft 5 from an opening end 101B at the outer diameter side. In addition, since the exhaust air flows in a laminar flow state in each of the air outflow holes 101 extending in the tangential direction of the inner peripheral surface 5B of the rotational shaft 5, the discharge efficiency can be enhanced with adjustment of the air flow.

Thus, also in the ninth embodiment configured in this way, an operational effect as substantially similar to that of the aforementioned first embodiment can be obtained. Particularly, according to the ninth embodiment, each of the air outflow holes 101 is formed to be inclined to the direction in reverse to the rotating direction of the rotational shaft 5 in the position eccentric in the tangential direction of the inner peripheral surface 5B of the rotational shaft 5. As a result, each of the air outflow holes 101 enables the exhaust air to positively flow out outside of the rotational shaft 5 from the annular gap space 18 with use of rotating forces of the rotational shaft 5.

It should be noted that the first embodiment is explained by taking a case where the motor case 4 of the air motor 3 is insert-fitted in the motor accommodating section 2C of the housing 2 for mounting, as an example. However, the present invention is not limited thereto, and, for example, a ring member made of an elastic element may be provided in the periphery of the motor case 4 to elastically support the air motor 3 to the motor accommodating section 2C of the housing 2. This configuration can be applied to the other embodiments.

The seventh embodiment exemplifies a case where the annular projecting portion 81 is provided on the inner peripheral surface 5B of the rotational shaft 5, and the eighth embodiment exemplifies a case where the three annular projecting portions 91, 92, 93 are provided on the inner peripheral surface 5B of the rotational shaft 5. However, the present invention is not limited thereto, and the annular projecting portions 81, 91, 92, 93 may be provided on the outer peripheral surface 17B of the feed tube 17 or on each of the inner peripheral surface 5B of the rotational shaft 5 and the outer peripheral surface 17B of the feed tube 17.

On the other hand, the first embodiment is explained by taking a case of the direct charging type electrostatic coating machine that directly applies high voltages to the rotary atomizing head type coating machine 1, as an example. However, the present invention is not limited thereto, and may be applied to, for example, an indirect electrifying type electrostatic coating machine that applies high voltages to paint particles sprayed from a rotary atomizing head by external electrodes. Further, the present invention can be applied to a non-electrostatic coating machine that performs coating without applying high voltages.

DESCRIPTION OF REFERENCE NUMERALS

1: Rotary atomizing head type coating machine
2: Housing
2C: Motor accommodating section
3: Air motor
4: Motor case
5: Rotational shaft
5B, 8A: Inner peripheral surface
5C, 8B, 17B: Outer peripheral surface
6: Turbine
6A, 8C, 12A: Front surface
6B, 9A: Rear surface
6C: Impeller
7: Radial thrust air bearing
8: Radial air bearing
8E: Radial air ejecting hole
9: Front thrust air bearing
9B, 12B: Thrust air ejecting hole
10: Annular radial gap
11: Front thrust gap
12: Rear thrust air bearing
13: Rear thrust gap
14: Turbine air passage
14A: Air supply passage
14B: Air discharge passage
15: Bearing air passage
16: Rotary atomizing head
17: Feed tube
17A: Paint passage
18: Annular gap space
19: Shaping air ring
19B: Air ejecting hole
25, 51, 61, 101: Air outflow hole
31, 41, 52, 81, 91, 92, 93: Annular projecting portion
51A, 51B, 101A, 101B: Opening end
71: Outer annular projecting portion
72: Inner annular projecting portion

The invention claimed is:
1. A rotary atomizing head type coating machine comprising:
a tubular housing in an inner peripheral side of which a motor accommodating section is formed;
an air motor that is accommodated in said motor accommodating section of said housing and rotates a hollow rotational shaft
a rotary atomizing head that is positioned on the front side of said housing and is mounted to the front end of said rotational shaft in said air motor to spray paint supplied while rotating together with said rotational shaft;
a feed tube that is provided inside said rotational shaft to axially extend with a radial gap to said rotational shaft and supplies the paint to said rotary atomizing head; and
a shaping air ring that is provided on the front side of said housing to eject shaping air for arranging a spraying pattern of the paint sprayed from said rotary atomizing head, wherein said air motor includes:
a motor case that is formed of a tubular body axially extending and is accommodated in said motor accommodating section of said housing;
said rotational shaft that is provided in said motor case to axially extend therein;
a turbine that is provided at a base end side of said rotational shaft and rotates said rotational shaft by supply of turbine air thereto;
a radial air bearing that is positioned on an outer peripheral side of said rotational shaft and is provided in said motor case to radially support said rotational shaft by supply of bearing air thereto;
a front thrust air bearing and a rear thrust air bearing that are provided in said motor case to interpose said turbine therebetween in the front-rear direction to support said rotational shaft in a thrust direction by supply of the bearing air thereto;
a turbine air passage that includes an air supply passage for supplying the turbine air to said turbine and an air discharge passage for discharging exhaust air after rotating said turbine; and
a bearing air passage that supplies the bearing air to said radial air bearing and said front and rear thrust air bearings, wherein further including:
an annular gap space, into which a part of said turbine air and exhaust air discharged from said rear thrust air bearing flow out, is provided between said rotational shaft and said feed tube, and
an air outflow hole is provided in said rotational shaft to be positioned between said radial air bearing and said rotary atomizing head and to be radially bored through said rotational shaft, wherein
said air outflow hole causes said exhaust air flowing in said annular gap space to flow out outside of said rotational shaft in a position behind said rotary atomizing head.
2. The rotary atomizing head type coating machine according to claim 1, wherein said air outflow holes are arranged in a plurality of locations in said rotational shaft to be spaced from each other in the circumferential direction.

3. The rotary atomizing head type coating machine according to claim 1, wherein an annular projecting portion is provided on an inner peripheral surface of said rotational shaft and/or on an outer peripheral surface of said feed tube in a position closer to said rotary atomizing head than a position of said air outflow hole, said annular projecting portion radially projecting from said inner peripheral surface and/or said outer peripheral surface to partition said annular gap space.

* * * * *